(12) United States Patent
Aridome et al.

(10) Patent No.: US 7,796,862 B2
(45) Date of Patent: Sep. 14, 2010

(54) INFORMATION RECORDING APPARATUS AND INFORMATION RECORDING METHOD

(75) Inventors: Kenichiro Aridome, Kanagawa (JP); Osamu Date, Saitama (JP)

(73) Assignee: Sony Corporation (JP)

( * ) Notice: Subject to any disclaimer, the term of this patent is extended or adjusted under 35 U.S.C. 154(b) by 1348 days.

(21) Appl. No.: 10/531,235

(22) PCT Filed: Jul. 13, 2004

(86) PCT No.: PCT/JP2004/010269
§ 371 (c)(1), (2), (4) Date: Nov. 2, 2005

(87) PCT Pub. No.: WO2005/022908
PCT Pub. Date: Mar. 10, 2005

(65) Prior Publication Data
US 2006/0140587 A1      Jun. 29, 2006

(30) Foreign Application Priority Data
Aug. 29, 2003 (JP) .............................. 2003-306867

(51) Int. Cl.
*H04N 7/00* (2006.01)
*H04N 5/91* (2006.01)
(52) U.S. Cl. .............................. 386/95; 386/46; 386/96
(58) Field of Classification Search .................... 386/95, 386/96, 46
See application file for complete search history.

(56) References Cited

U.S. PATENT DOCUMENTS

| | | | | |
|---|---|---|---|---|
| 6,434,103 B1 * | 8/2002 | Shitara et al. | .................. | 369/83 |
| 6,580,872 B1 * | 6/2003 | Kikuchi et al. | ................. | 386/95 |
| 2003/0123853 A1 * | 7/2003 | Iwahara et al. | ................. | 386/69 |
| 2003/0152365 A1 | 8/2003 | Nagayama | | |
| 2003/0152369 A1 | 8/2003 | Isobe et al. | | |

FOREIGN PATENT DOCUMENTS

| | | |
|---|---|---|
| JP | 10-050035 A | 2/1998 |
| JP | 2001-326910 A | 11/2001 |
| JP | 2003-091975 A | 3/2003 |
| JP | 2003-153140 A | 5/2003 |
| JP | 2003-308675 A | 10/2003 |

OTHER PUBLICATIONS

Supplementary European Search Report, EP 04 74 7733.

* cited by examiner

*Primary Examiner*—Thai Tran
*Assistant Examiner*—Girumsew Wendmagegn
(74) *Attorney, Agent, or Firm*—Lerner, David, Littenberg, Krumholz & Mentlik, LLP

(57) ABSTRACT

A top menu is configured to provide information about chapters contained in a recording medium when it is finalized. From an optical disk as a recording medium, a title retrieval section reads title information about each title of motion picture data recorded on the optical disk. A chapter retrieval section reads chapter information about each chapter in the corresponding title based on the title information obtained in this manner. Based on the chapter information obtained in this manner, a representative picture selection section selects a representative picture in each chapter. A menu generation section generates the top menu including a display area to reproduce chapters based on the chapter information obtained by the chapter retrieval section.

14 Claims, 19 Drawing Sheets

FIG. 8

768 — ARI_PCK

| ADDITIONAL RECORDING INFORMATION IDENTIFIER | | |
|---|---|---|
| | ARI_DAT_ID | ADDITIONAL RECORDING INFORMATION DATA IDENTIFIER |
| | ARI_DAT_VER | ADDITIONAL RECORDING INFORMATION VERSION |
| APPLICATION INFORMATION | | |
| | VND_NAME | VENDOR NAME |
| | PRD_NAME | PRODUCT NAME |
| | APL_ID | APPLICATION IDENTIFIER |
| | MNFI_DATA | MANUFACTURER INFORMATION DATA |
| | PRD_TYP | APPARATUS TYPE |
| RECORDING TIME INFORMATION | | |
| | VOBU_LCL_TM_ZOME | TIME ZONE FOR ARI_DATA RECORDING |
| | VOBU_REC_TM | ARI_DATA RECORDING TIME |
| CAMERA INFORMATION | | |
| | F_NUM | F NUMBER |
| | EXP_TM | EXPOSURE TIME |
| | EXP_PRG | EXPOSURE PROGRAM |
| | EXP_BIS_VAL | EXPOSURE CORRECTION VALUE |
| | AGC | GAIN VALUE |
| | MAX_APE_VAL | MINIMUM LENS F VALUE |
| | FLS | FLASH |
| | FCL_LEN | LENS FOCAL DISTANCE |
| | WHT_BAL | WHITE BALANCE |
| | SCN_CAP_TYP | SCENE CAPTURING TYPE |
| | FCS_MOD | FOCUS MODE |
| | FCS_POS | SUBJECT DISTANCE |
| | IMG_STB | CAMERA-SHAKE CORRECTION |
| | STB_LIM | CAMERA-SHAKE CORRECTION LIMIT |
| | DIG_ZOM | DIGITAL ZOOM RATIO |
| | EFFECT | EFFECT CAPTURING |

INFORMATION RECORDING APPARATUS AND INFORMATION RECORDING METHOD

BACKGROUND OF THE INVENTION

The present invention relates to an information recording apparatus. More specifically, the present invention concerns an information recording apparatus, an information recording method, and a program allowing a computer to execute a method for providing a top menu with information about each chapter contained in a recording medium subject to a finalization process.

In recent years, particular attention has been paid to an optical disk as a recording medium capable of recording audiovisual data. The DVD-Video standard has been adopted as one optical disk standard. According to the DVD-Video standard, for example, a 12 cm single-side, single-layer disk can store approximately 4.7 gigabytes of data. An 8 cm single-side, single-layer disk can store approximately 1.5 gigabytes of data. The DVD-Video standard has been adopted as media for content products such as movies. Disks compliant with the DVD-Video standard can be reproduced on a DVD-Video standard reproduction apparatus (i.e., a DVD player).

On the other hand, the extent of using optical disks has broadened to ake user recordable optical disks available. For example, there are known the DVD-R standard capable of recording only once on the same area and the DVD-RW standard capable of repeated writing. The DVD-R and DVD-RW disks are capable of updating the recorded contents through write-once or rewriting operations as long as a sufficient capacity remains. However, the updateable state is not compliant with the DVD-Video standard and is not suited for reproduction on the above-mentioned DVD-Video reproduction apparatus. To solve this problem, specified information needs to be written so that the DVD-R or DVD-RW recording format is compliant with the DVD-Video standard. This is called a finalization process. A finalized disk disables additional data recording. By executing unfinalization, a DVD-RW disk can resume the data recordable format.

The DVD-Video standard allows up to 99 titles to be recorded on one disk. Each title can contain up to 99 chapters (PTT: Part of TiTle). When a camcorder (camera and recorder) is used for recording, the above-mentioned DVD-R or DVD-RW disk records one recording unit from the beginning of the recording to the end thereof as a chapter. The chapter is recorded as the same title until a specified condition is satisfied. Specified conditions to close the title include ejecting the disk, reaching 99 chapters in the title, reaching 99 cells in the title, and changing from motion picture recording to still picture recording. When the disk is recorded by the camcorder and then is finalized, a top menu provides a title-based menu. To display a chapter-based menu, it is necessary to select an intended title from the top menu, and then move to a chapter menu corresponding to the title (e.g., see FIG. 4 in JP-A No. 326910/2001).

Logical structures about various information on optical disks are detailed in JP-A No. 50035/1998 (FIG. 7) and JP-A No. 91975/2003 (FIG. 9).

When the above-mentioned prior art is used to record a disk by means of the camcorder, the top menu displays title-based menus. Displaying a chapter-based menu requires moving to a chapter menu corresponding to each title. As mentioned above, however, the camcorder semiautomatically categorizes titles not always in synchronization with the recording contents. Accordingly, it is inconvenient to switch between the top menu and the chapter to reference a chapter-based menu.

It is therefore an object of the present invention to allow the top menu to provide information about chapters contained in a recording medium when it is finalized.

SUMMARY OF THE INVENTION

To solve the above-mentioned problem, an information recording apparatus according to the present invention includes title retrieval means for reading from a recordable medium title information for respective titles for motion picture data recorded on the recordable medium; chapter retrieval means for reading chapter information for respective chapters in the respective titles based on the title information; and menu generation means for generating a top menu and for recording the top menu on the recordable medium, the top menu including a display area for reproducing the respective chapters based on the chapter information. In this manner, there is provided an effect of generating the top menu including the display area for reproducing respective chapters based on the read chapter information.

In the information recording apparatus, the menu generation means may generate the top menu so as to contain capturing time information for the respective chapters. In this manner, there is provided an effect of allowing the top menu to easily recognize the capturing time.

The information recording apparatus of the present invention may further include representative picture selection means for selecting a representative picture in the respective chapters based on the chapter information, wherein the menu generation means generates the top menu so as to contain the representative picture associated with a corresponding display area. In this manner, there is provided an effect of allowing the top menu to include the representative picture for respective chapters.

In the information recording apparatus according to the present invention, the representative picture selection means may select first closed picture data in the respective chapters as the representative picture. In this manner, there is provided an effect of allowing the top menu to include the first closed picture data for respective chapters.

In the information recording apparatus according to the present invention, the representative picture selection means may select an I picture in beginning VOBU for the respective chapters as the representative picture. In this manner, there is provided an effect of allowing the top menu to include the I picture in the beginning VOBU for respective chapters.

In the information recording apparatus according to the present invention, when the first closed picture data has a specified attribute, the representative picture selection means selects succeeding closed picture data not having the specified attribute as the representative picture. In this manner, there is provided an effect of preventing the first closed picture data from being selected as a representative picture when the first closed picture data has a specified attribute.

In the information recording apparatus according to the present invention, when the first closed picture data exceeds a camera-shake correction limit, the representative picture selection means selects succeeding closed picture data not exceeding the camera-shake correction limit as the representative picture. In this manner, there is provided an effect of preventing the first closed picture data from being selected as a representative picture when the first closed picture data exceeds the camera-shake correction limit.

In the information recording apparatus according to the present invention, when the first closed picture data depends on specified effect capturing, the representative picture selection means selects succeeding closed picture data independent of the specified effect capturing as the representative picture. In this manner, there is provided an effect of preventing the first closed picture data from being selected as a representative picture when the first closed picture data depends on specified effect capturing.

The information recording apparatus according to the present invention may further include apparatus type detection means for detecting an apparatus type having recorded the motion picture data for the respective titles on the recordable medium, wherein the chapter retrieval means, when the apparatus type for a title corresponds to a specified type, reads the chapter information for all chapters contained in the title and, when the apparatus type for the title does not correspond to the specified type, reads the chapter information only for a beginning chapter in the title. In this manner, there is provided an effect of allowing the top menu to include all chapters contained in the title when the apparatus type corresponds to a specified type and allowing the top menu to include only the beginning chapter in that title when the apparatus type does not correspond to the specified type.

In the information recording apparatus according to the present invention, when the apparatus type for a title is a camcorder, the chapter retrieval means reads the chapter information for all chapters contained in the title and, when the apparatus type for the title is not a camcorder, reads the chapter information only for a beginning chapter in the title. In this manner, there is provided an effect of allowing the top menu to include all chapters contained in the title when the apparatus type is a camcorder and allowing the top menu to include only the beginning chapter in that title when the apparatus type is not a camcorder.

An information recording method according to the present invention includes reading from a recordable medium title information for respective titles for motion picture data recorded on the recordable medium; reading chapter information for respective chapters in the respective titles based on the title information; and generating a top menu and recording the top menu on the recordable medium, the top menu including a display area for reproducing the respective chapters based on the chapter information. In this manner, there is provided an effect of generating the top menu including the display area for reproducing respective chapters based on the read chapter information.

Another information recording method according to the present invention includes reading from a recordable medium title information for respective titles for motion picture data recorded on the recordable medium; reading chapter information for respective chapters in the respective titles based on the title information; selecting a representative picture in the respective chapters based on the chapter information; and generating a top menu and recording the top menu on the recordable medium, the top menu including a display area for reproducing the respective chapters associated with the representative pictures based on the chapter information. In this manner, there is provided an effect of including a representative picture for respective chapters in the top menu containing a display area to reproduce respective chapters.

Still another information recording method according to the present invention includes reading from a recordable medium title information for respective titles for motion picture data recorded on the recordable medium; reading chapter information for a beginning chapter in the respective titles based on the title information; detecting an apparatus type having recorded the motion picture data for the respective titles on the recordable medium; reading the chapter information for respective chapters following the beginning chapter when the apparatus type corresponds to a specified type; and generating a top menu and recording the top menu on the recordable medium, the top menu including a display area for reproducing the respective chapters based on the chapter information. In this manner, the top menu is allowed to include all chapters contained in the title when the apparatus type corresponds to a specified type and is allowed to include only the beginning chapter in that title when the apparatus type does not correspond to the specified type.

A recording medium according to the present invention is recorded with a program for causing a computer to execute an information processing method, the method including reading from a recordable medium title information for respective titles for motion picture data recorded on the recordable medium; reading chapter information for respective chapters in the respective titles based on the title information; and generating a top menu and recording the top menu on the recordable medium, the top menu including a display area for reproducing the respective chapters based on the chapter information. In this manner, there is provided an effect of generating the top menu including the display area for reproducing respective chapters based on the read chapter information.

Another recording medium according to the present invention is recorded with a program for causing a computer to execute an information recording method, the method including reading from a recordable medium title information for respective titles for motion picture data recorded on the recordable medium; reading chapter information for respective chapters in the respective titles based on the title information; selecting a representative picture in the respective chapters based on the chapter information; and generating a top menu and recording the top menu on the recordable medium, the top menu including a display area for reproducing the respective chapters associated with the respective pictures based on the chapter information. In this manner, there is provided an effect of including a representative picture for respective chapters in the top menu containing a display area to reproduce respective chapters.

A further recording medium according to the present invention is recorded with a program for causing a computer to execute an information recording method, the method including reading from a recordable medium title information for respective titles for motion picture data recorded on the recordable medium; reading chapter information for a beginning chapter in the respective titles based on the title information; detecting an apparatus type having recorded the motion picture data for the respective titles on the recordable medium; reading the chapter information for respective chapters following the beginning chapter when the apparatus type corresponds to a specified type; and generating a top menu and recording the top menu on the recordable medium, the top menu including a display area for reproducing the respective chapters based on the chapter information. In this manner, the top menu is allowed to include all chapters contained in the title when the apparatus type corresponds to a specified type and is allowed to include only the beginning chapter in that title when the apparatus type does not correspond to the specified type.

BRIEF DESCRIPTION OF THE DRAWINGS

FIG. 8 shows the data structure of additional recording information (ARI_PCK) according to an embodiment of the present invention.

DETAILED DESCRIPTION

An embodiment of the present invention will be described in further detail with reference to the accompanying drawings.

Figure 1:
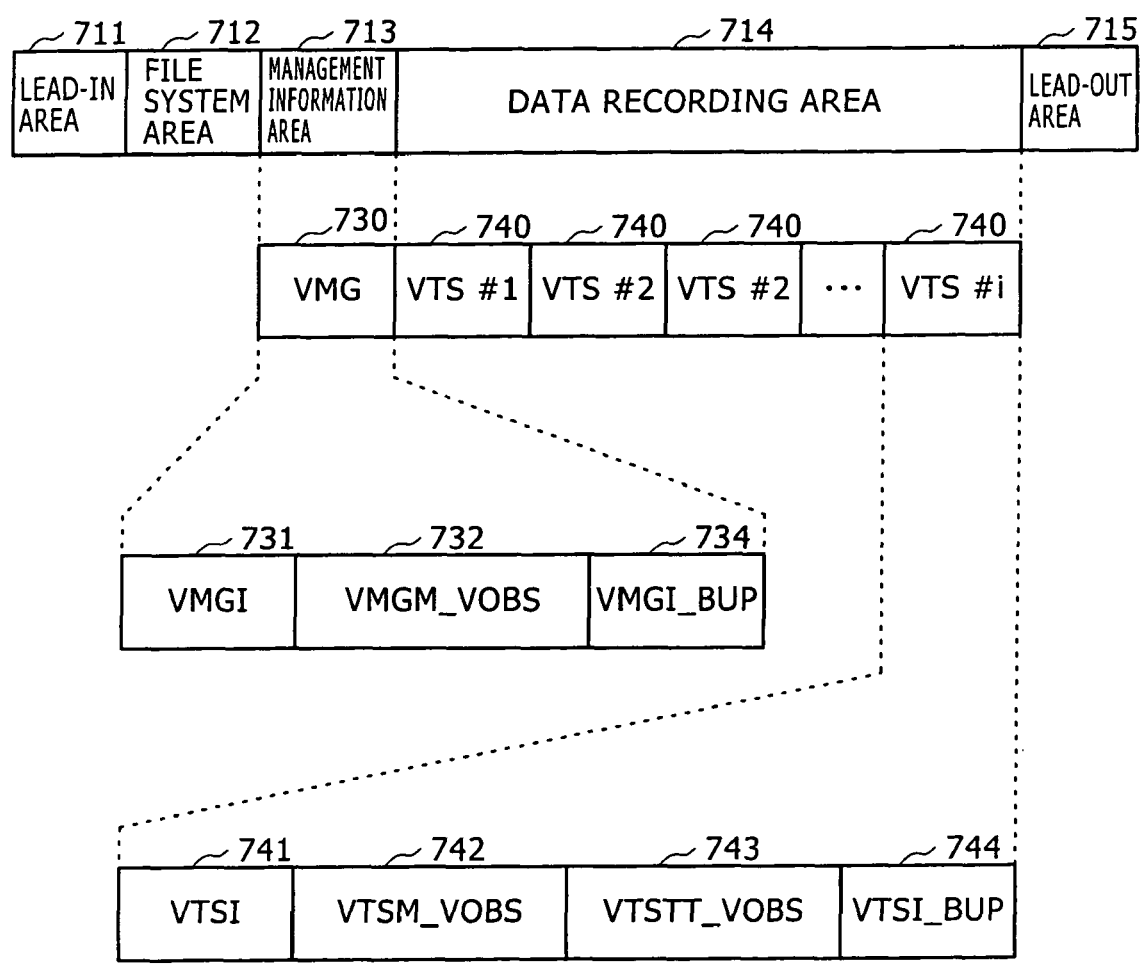
FIG. 1 shows the data structure of a disk compliant with the DVD-Video standard.

FIG. 1 shows the data structure of a disk compliant with the DVD-Video standard. The disk is circular and is provided with a lead-in area 711 toward the inside periphery and with a lead-out area 715 toward the outside periphery. From the inside periphery to the outside periphery there are provided a file system area 712, a management information area 713, and a data recording area 714 in order. The file system area 712 is a management area for the file system and is provided to comply with the ISO9660 and UDF (Universal Disk Format) standards. The management information area 713 contains management information about overall video contents. The data recording area 714 contains the contents of video title sets and associated control information. These areas are divided into 2048-byte logical sectors.

The management information area 713 contains a VMG (Video ManaGer) 730. The VMG 730 comprises VMGI (VMG Information) 731, VMGM_VOBS (Video OBject Set for VMG Menu) 732, and VMGI_BUP (VMGI for Back UP) 734. As will be described later, the VMGI 731 contains title-based management information about video contents recorded on the disk and control information about the top menu. The VMGM_VOBS 732 contains data for the top menu. The VMGI_BUP 734 is a backup copy of the VMGI 731.

The data recording area 714 contains at least one VTS (Video Titles Set) 740. Each VTS 740 comprises VTSI (VTS Information) 741, VTSM_VOBS (Video OBject Set for VTS Menu) 742, VTSTT_VOBS (Video Object Set for Titles in a VTS) 743, and VTSI_BUP (VTSI for Back UP) 744. As will be described later, the VTSI 741 contains chapter-based management information and control information about a chapter contained in the video title set and control information about the chapter menu. The VTSM_VOBS 742 contains data for the chapter menu. The VTSTT_VOBS 743 contains data for a title contained in the video title set. The VTSI_BUP 744 is a backup copy of the VTSI 741.

Figure 2:
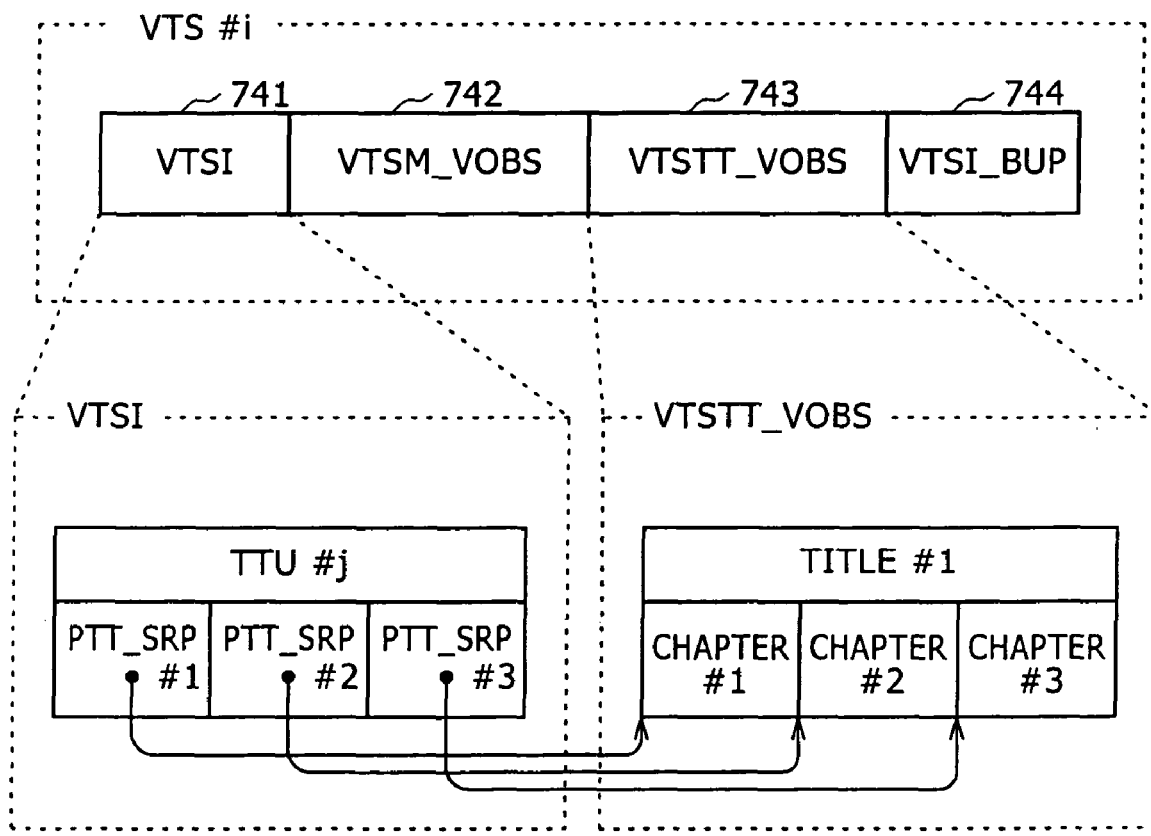
FIG. 2 shows the relationship between a title and a chapter in a video title set (VTS).

FIG. 2 shows the relationship between a title and a chapter in a video title set (VTS). As mentioned above, the VTSTT_VOBS 743 records actual data of the video content. Each VTS 740 can store up to 99 titles. Since the entire disk can store only up to 99 titles, the maximum number of titles is affected by the usage of the other VTSs.

Each title in the VTS 740 is divided into at least one chapter. Each title can contain up to 99 chapters. The camcorder records a chapter, i.e., one recording unit from the beginning of the recording to the end thereof. A chapter is generated in the same title until occurrence of events such as ejecting the disk, reaching 99 chapters in the title, reaching 99 cells in the title, and changing from motion picture recording to still picture recording, for example. Accordingly, the title is closed when the number of chapters reaches 99 during repeated recording in the camcorder. The next chapter is created in a new title.

The VTSI 741 contains the chapter start position in each title. As will be described later, the VTSI 741 contains a pointer (PTT_SRP) that indicates the start position of each chapter. This pointer is used as title-based management information (TTU).

Figure 3:
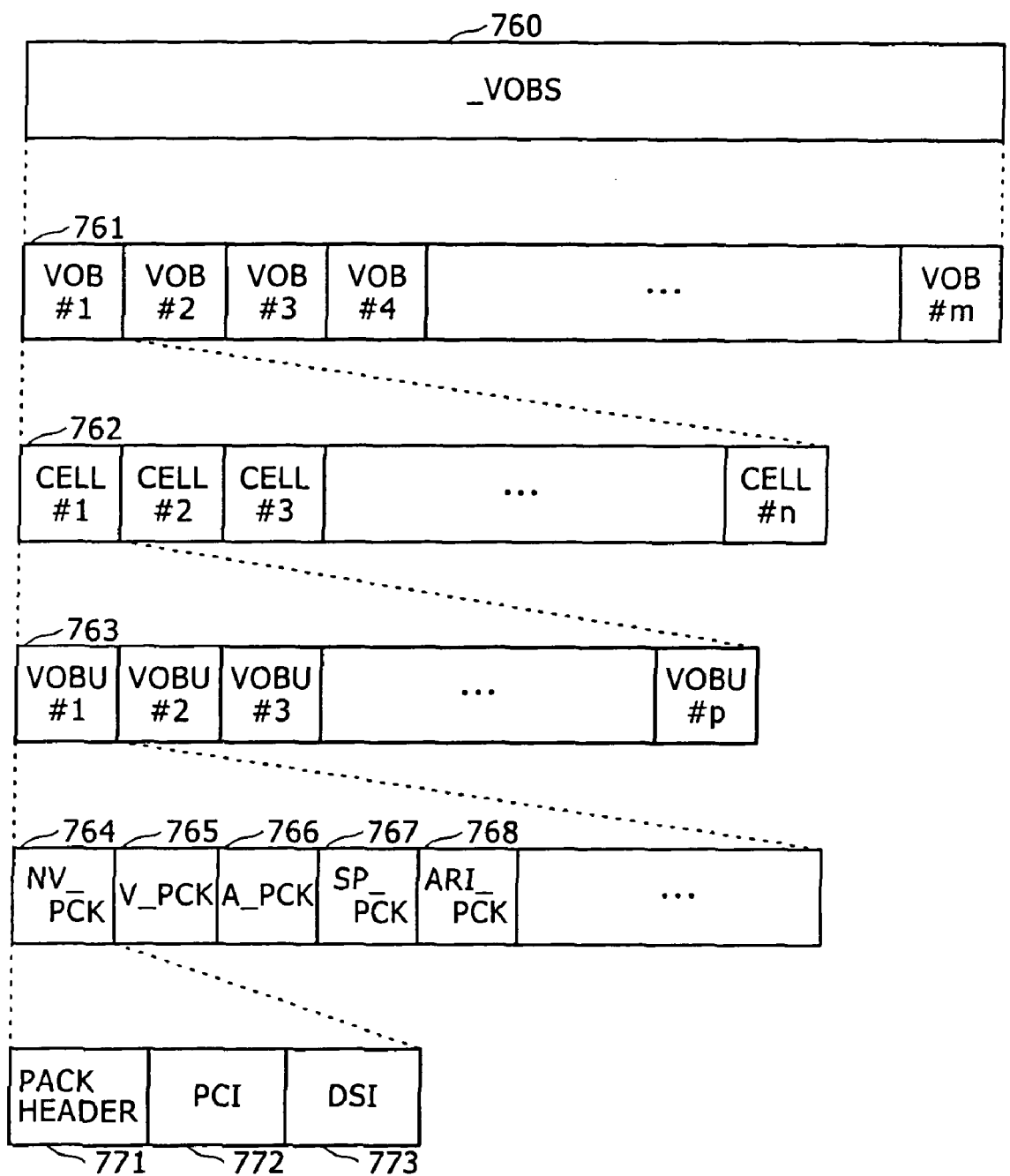
FIG. 3 shows constituent elements of a video object set (VOBS).

FIG. 3 shows constituent elements of a video object set (VOBS). The VMGM_VOBS 732, the VTSM_VOBS 742, and the VTSTT_VOBS 743 in FIG. 1 maintain the corresponding data as a video object set (VOBS) and use the common format. The VOBS 760 is a set of one or more video objects (VOB) 761. The VOB 761 is assigned a VOB_ID number used for identification. The VOB 761 comprises one or more cells 762. The cell 762 is a real-time reproduction unit and is assigned a cell ID like the VOB 761.

The cell 762 contains one or more video object unit (VOBU) 763. The VOBU 763 is a pack sequence beginning with a navigation pack (NV_PCK) 764. The pack is 2048-byte fixed data. In addition to the beginning NV_PCK 764, the pack also contains a video pack (V_PCK) 765, an audio pack (A_PCK) 766, a sub-picture pick (SP_PCK) 767, and an additional recording information pack (ARI_PCK) 768 as needed. The video pack (V_PCK) 765 contains video data. The audio pack (A_PCK) 766 contains audio data. The sub-picture pack (SP_PCK) 767 contains sub-picture data. The additional recording information pack (ARI_PCK) 768 contains additional recording information.

The NV_PCK 764 contains a pack header 771 followed by Presentation Control Information (PCI) 772 and Data Search Information (DSI) 773. The PCI 772 is control information about reproduction and display. The PCI 772 contains angle information for non-seamless reproduction and information for sub-picture highlight display. The DSI 773 is control information for disk access. The DSI 773 contains angle information for seamless reproduction and VOBU retrieval information in units of reproduction time (0.5 seconds multiplied by n).

Figure 4:
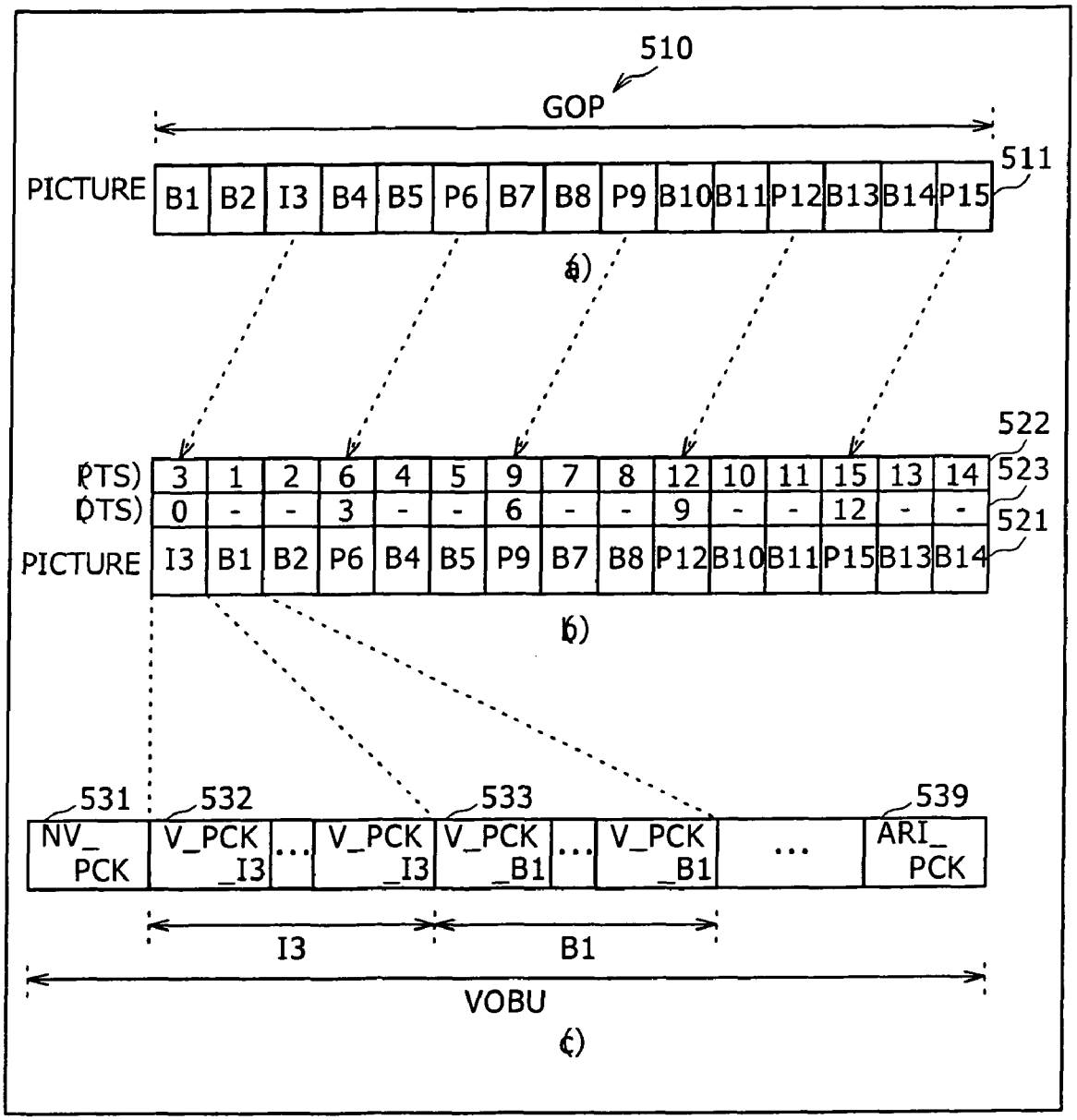
FIG. 4 shows the relationship between a video object unit (VOBU) and a coded image.

FIG. 4 shows the relationship between the video object unit (VOBU) and a coded image. Picture data in the VOBS 760 is encoded according to MPEG-2 (Moving Picture Coding Experts Group-2) encoding. The MPEG-2 encoding uses 15 pictures called GOP (Group Of Pictures) to represent a motion picture for approximately 0.5 seconds. FIG. 4(a) shows a GOP 510 comprising a total of 15 pictures 511 composed of one I picture, four P pictures, and ten B pictures. The I picture is an in-frame encoded picture. The I picture is an closed picture encoded independently of the other P and B pictures. The P picture is encoded by using a difference between itself and a chronologically preceding I or P picture. The B picture is encoded by using a difference between itself and chronologically preceding and succeeding I or P pictures. Therefore, only the I picture can be independently decoded in the GOP.

Figure 15:
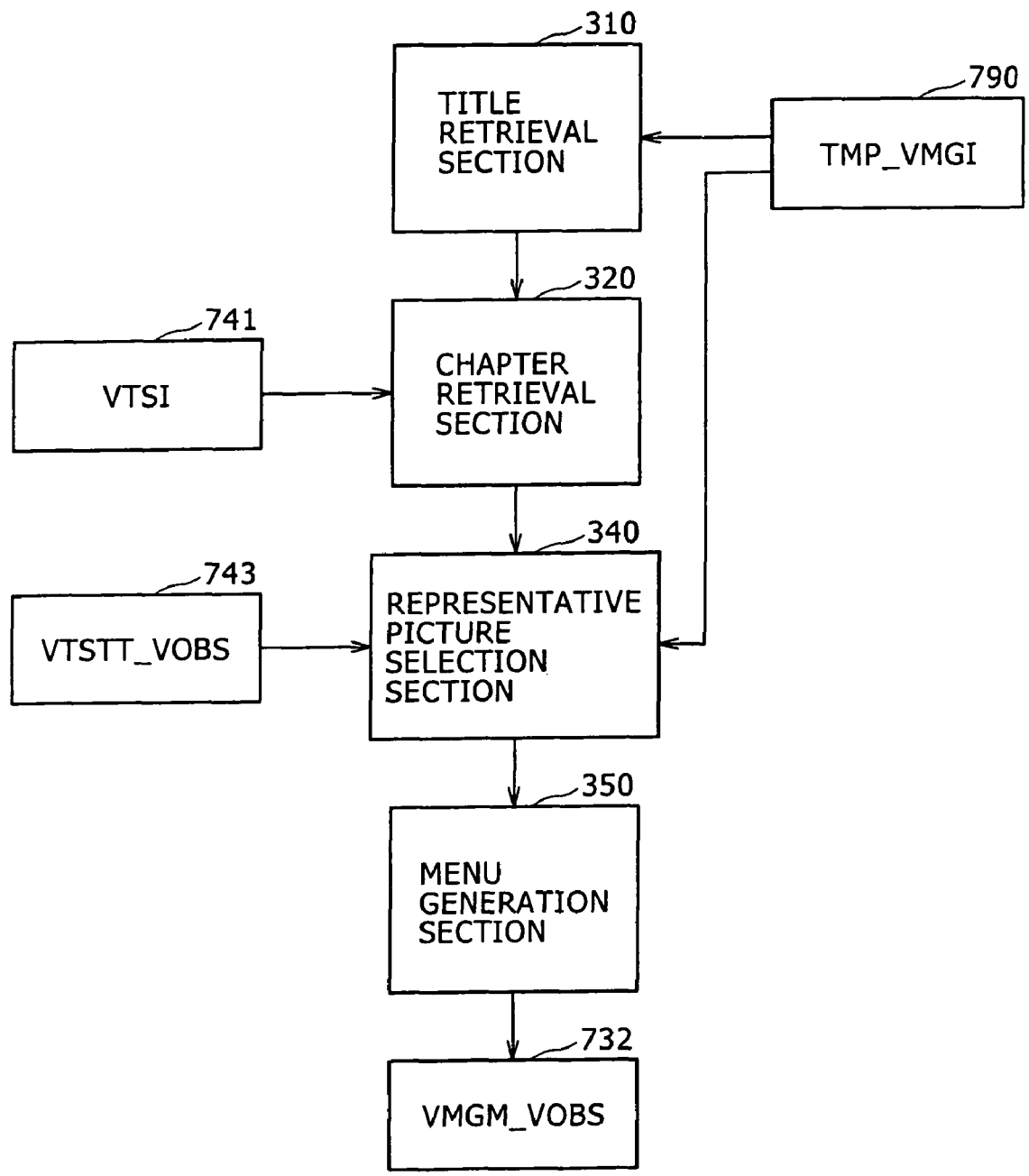
FIG. 15 shows a function configuration example to implement a finalization process according to the embodiment of the present invention.

As shown in FIG. 4(b), 15 pictures in the GOP are recorded by partially changing the sequence of pictures. This is based on the feature of the above-mentioned encoding system and aims at avoiding a wait for chronologically subsequent pictures during decoding. For example, decoding a B picture (B5) needs to reference an I picture (I3) and a P picture (P6). Changing the picture sequence as shown in FIG. 4(b) can provide the picture data (I3 and P6) needed at the time of decoding the B picture (B5). Time stamps such as a PTS (Presentation Time Stamp) 522 and a DTS (Decoding Time Stamp) 523 are provided to maintain the sequence of pictures 521. The PTS 522 is time management information for reproduction and output and indicates when to reproduce or output a unit picture provided with the time stamp. The DTS 523 is time management information for decoding and indicates when to decode a unit picture provided with the time stamp.

The encoded picture is contained in one or more packs as shown in FIG. 4(c). For example, the I picture (I3) is maintained as V_PCK_I3 (532). The B picture (B1) is maintained as V_PCK_B1 (533). Along with the NV_PCK 531 and the ARI_PCK 539, the V_PCK_I3 and the V_PCK_B1 constitute the VOBU.

Figure 5:
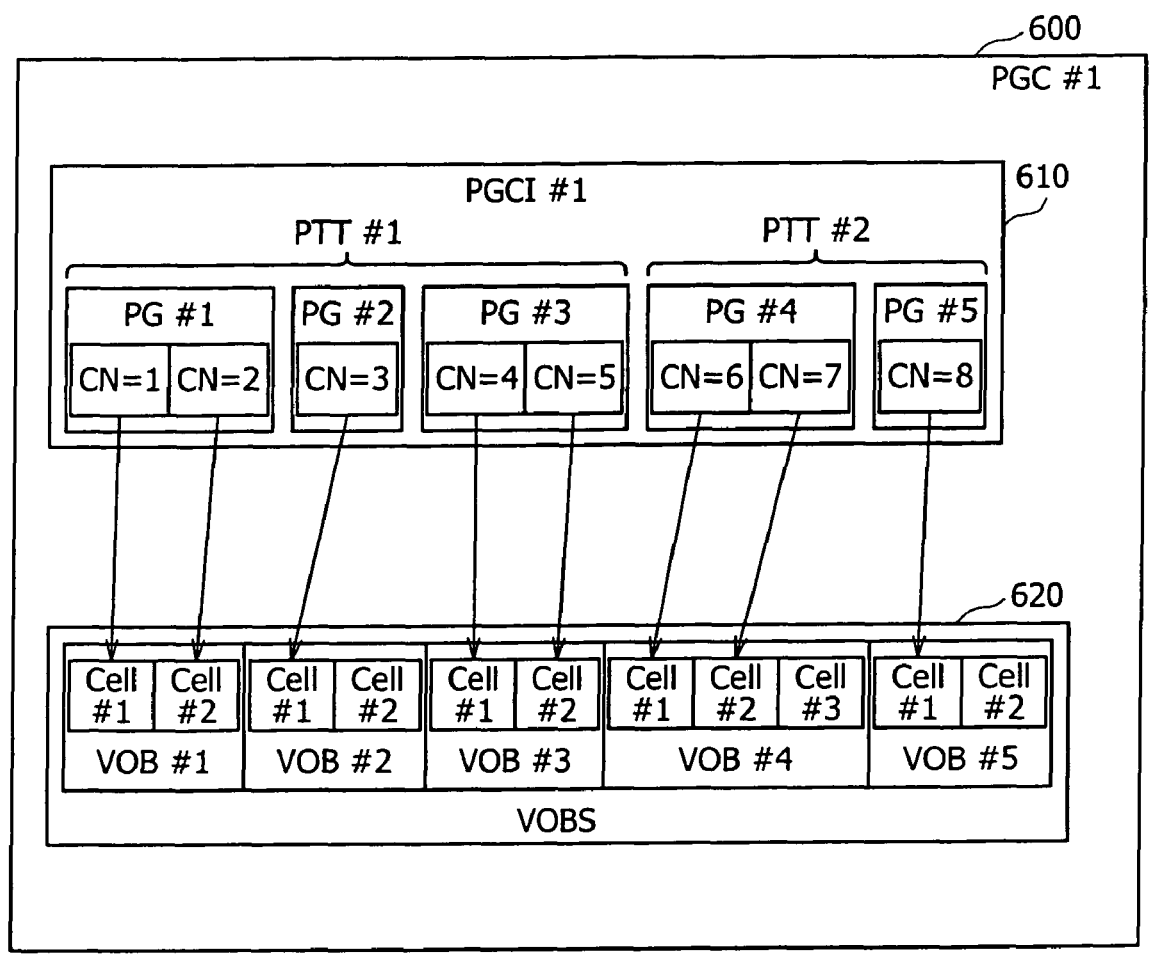
FIG. 5 shows the relationship between program chain information (PGCI) and a video object set (VOBS) in a program chain (PGC).

FIG. 5 shows the relationship between program chain information (PGCI) and the video object set (VOBS) in a program chain (PGC). A program chain PGC 600 comprises program chain information (PGCI) 610 and a video object set (VOBS) 620. The PGCI 610 indicates the sequence of the cell 762 as a reproduction unit. The VOBS 620 contains the cell 762.

As mentioned above, the VOBs and the cells constituting the VOBS 620 are provided with the ID numbers which, however, do not always indicate the reproduction sequence. Cell numbers in the PGCI 610 indicate a reproduction sequence. In the example of FIG. 5, cells in the VOBS 620 are reproduced according to the sequence of cell numbers (CN) in the PGCI 610, i.e., in the order of VOB#1-Cell#1, VOB#1-Cell#2, VOB#2-Cell#1, VOB#3-Cell#1, VOB#3-Cell#2, VOB#4-Cell#1, VOB#4-Cell#2, VOB#4-Cell#3, and VOB#5-Cell#1.

The PGC 600 allows one program (PG) to be defined as a collection of cells having one or more sequential cell numbers. The program is assigned with a program number. A chapter (PTT) can be defined as a collection of programs having one or more sequential program numbers. In the example of FIG. 5, PG#1 through PG#3 are defined as PTT#1. PG#4 and #5 are defined as PTT#2. Accordingly, VOB#1-Cell#1, VOB#1-Cell#2, VOB#2-Cell#1, VOB#3-Cell#1, and VOB#3-Cell#2 become the first chapter. VOB#4-Cell#1, VOB#4-Cell#2, VOB#4-Cell#3, and VOB#5-Cell#1 become the second chapter.

Figure 6:
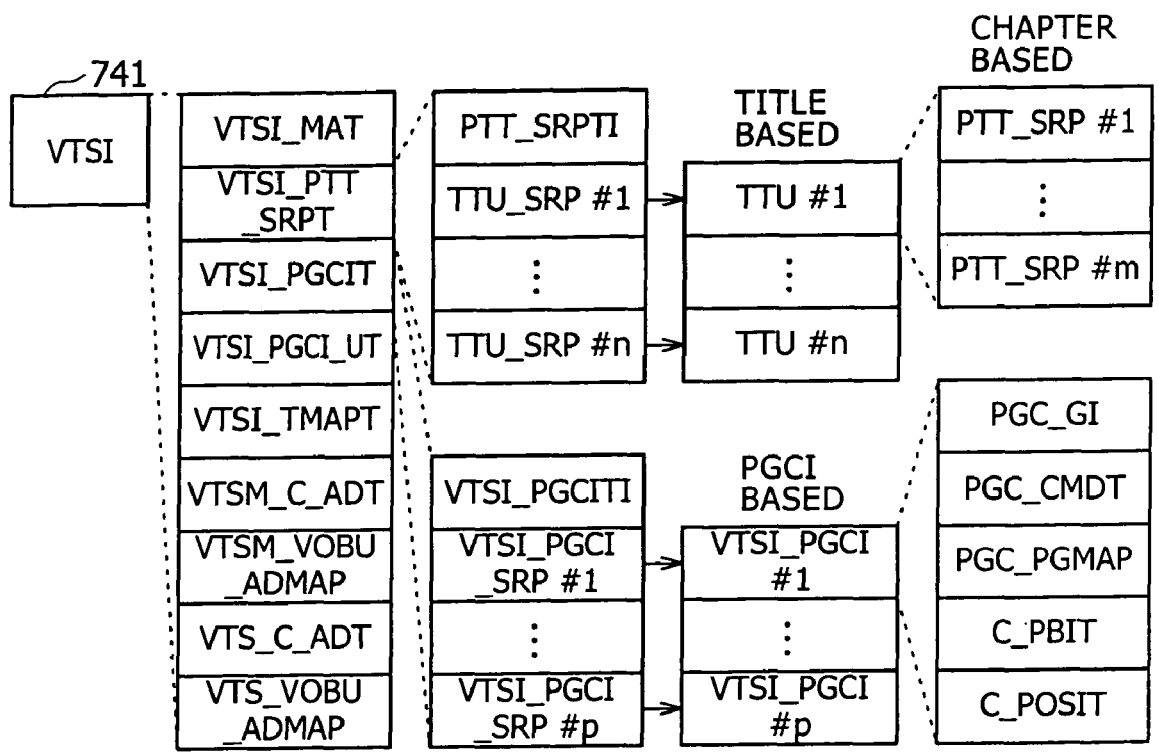
FIG. 6 shows the data structure of video title set information (VTSI).

FIG. 6 shows the data structure of video title set information (VTSI). VTSI 741 can have the following data structure: a VTSI (video title set information) MAnagement Table (VTSI_MAT), a VTS (video title set) PTT Search Pointer Table (VTS_PTT_SRPT), a VTS PGCI Table (VTS_PGCIT), a VTS Menu PGCI Unit Table (VTSM_PGCI_UT), a VTS Time MAP Table (VTS_TMAPT), a VTS Menu Cell ADdress Table (VTSM_C_ADT), a VTS Menu VOBU ADdress MAP (VTSM_VOBU_ADMAP), a VTS Cell ADdress Table (VTS_C_ADT), and a VTS VOBU ADdress MAP (VTS_VOBU_ADMAP).

The VTS_PTT_SRPT provides access information about a pointer to a chapter in each title. As mentioned above with reference to FIG. 2, the PTT_SRP is a pointer indicating the start position of each chapter. Specifically, a chapter is specified by a PGC number and a PG number. The PGC number is assigned to the PGC to which the chapter belongs. The PG number is contained in that PGC. The TTU contains the PTT_SRP corresponding to the title. The VTS_PTT_SRPT contains a pointer (TTU_SRP) to the TTU. Accordingly, the PTT_SRP for an intended chapter can be read by using the information included in the VTS_PTT_SRPT. As shown in FIG. 2, it is possible to find the starting position of the chapter in the VTSTT_VOBS.

The VTS_PGCIT in the VTSI is access information pointing to the PGCI so as to reproduce and control a program chain of video title sets. It is possible to provide one or more pieces of PGCI about video title sets as needed. The VTS_PGCIT contains a pointer (VTS_PGCI_SRP) to the VTS_PGCI.

The PGCI can have the data structure of PGC General Information (PGC_GI), a PGC CoMmanD Table (PGC_CMDT), a PGC ProGram Map (PGC_PGMAP), a Cell PlayBack Information Table (C_PBIT), and a Cell POSition Information Table (C_POSIT). The PGC_CMDT contains a command to be executed before, after, or during cell reproduction. The PGC_PGMAP contains a starting cell number for each program. The C_PBIT contains a category of cells, a starting address of the first VOBU in each cell, and the like. The C_POSIT contains each cell's VOB_ID number and a cell ID number. When the PGC number and the PG number are known, the PGC_PGMAP can be used to obtain a cell number of the starting cell in the program. Further, the C_POSIT can be used to obtain the VOB_ID number and the cell ID number from the cell number. In this manner, it is possible to know the specific position information in the VOBS. That is, the PGC number and the PG number in the PTT_SRP can be used to obtain the VOB_ID number and the cell ID number in the VTSTT_VOBS.

Figure 7:
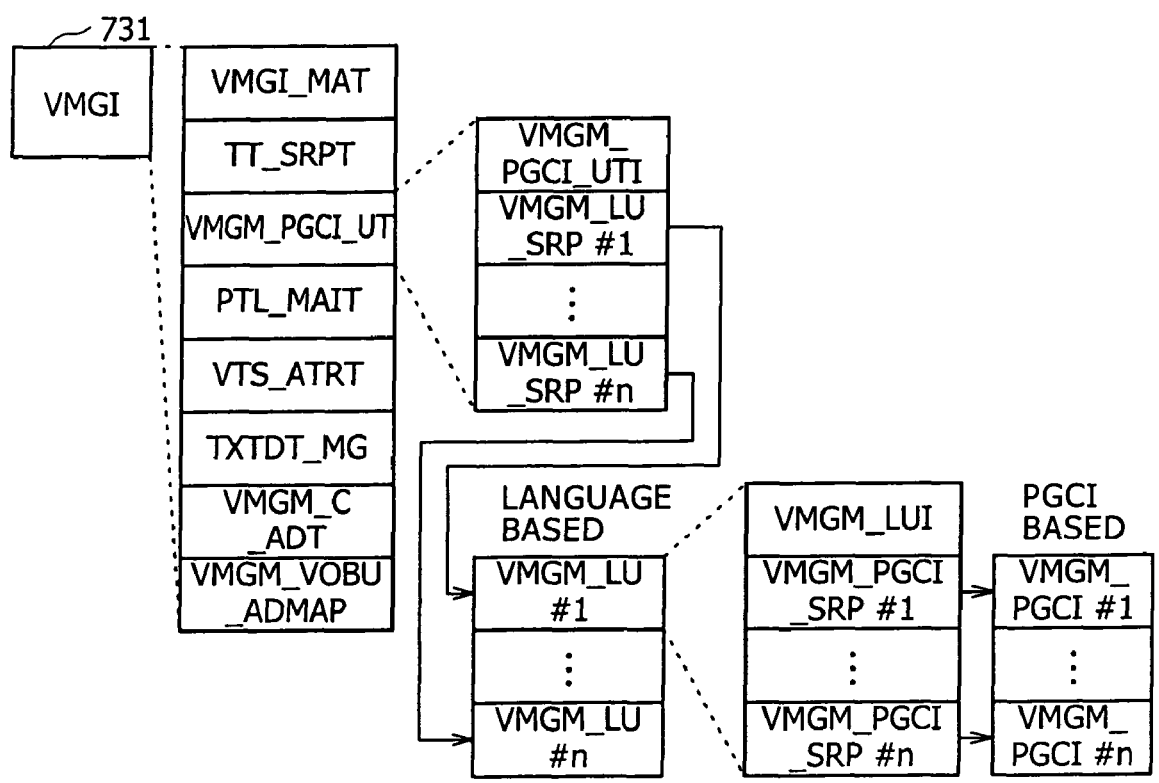
FIG. 7 shows the data structure of video manager information (VMGI).

FIG. 7 shows the data structure of video manager information (VMGI). VMGI 731 can have the data structure of a video manager information (VMGI) MAnagement Table (VMGI_MAT), a TiTle Search Pointer Table (TT_SRPT), a video manager (VMG) Menu PGCI Unit Table (VMGM_PGCI_UT), a ParenTaL MAnagement Information Table (PTL_MAIT), a video title set (VTS) AtTRibuTe Table (VTS_ATRT), a TeXT DaTa ManaGer (TXTDT_MG), a VMG Menu Cell ADdress Table (VMGM_C_ADT), and a VMG Menu VOBU ADdress MAP (VMGM_VOBU_ADMAP).

The VMGM_PGCI_UT is access information pointing to the PGCI so as to reproduce and control a program chain in the top menu. Each language can be provided with one or more pieces of PGCI (VMGM_PGCI) in the top menu. The VMGM_LU contains a pointer (VMGM_PGCI_SRP) to the VMGM_PGCI for each language. Further, the VMGM_PGCI_UT contains a pointer to the language-based VMGM_LU. Accordingly, the intended VMGM_PGCI can be read by using the information included in the VMGM_PGCI_UT. Moreover, the scheme as shown in FIG. 5 can be used to access the VMGM_VOBS 732, i.e., the top menu content.

FIG. 8 shows the data structure of additional recording information (ARI_PCK) according to the embodiment of the present invention. Information contained in ARI_PCK 768 is broadly divided into four types: an additional recording information identifier, application information, recording time information, and camera information.

An additional recording information identifier is used to identify that data in the packet is additional recording information. The additional recording information identifier records an additional recording information data identifier (ARI_DAT_ID) and its version number (ARI_DAT_VER).

Application information includes a vendor name (VND_NAME) as the product's manufacturer, a product name (PRD_NAME), an application identifier (APL_ID), a developer's information data (MNFI_DATA), and an apparatus type (PRD_TYP). The application identifier is information to identify a recording system during recording. The developer data is an area a developer can freely use. For example, the developer data records debug data for the development. The apparatus type is information to identify the apparatus type during recording. For example, the apparatus type indicates whether a portable camcorder or a desktop deck (recorder) is used for recording. The apparatus type may be constructed to be identifiable from the vendor name and the product name. In such case, however, there may be needed a database to obtain the apparatus type using the vendor name and the product name as a key. It is preferable to update the database via a network as needed.

The recording time information records: a time zone (VOBU_LCL_TM_ZONE) when recording additional recording information data (ARI_DATA) concerning a VOBU including the additional recording information; and a recording time (VOBU_REC_TM) for ARI_DATA. VOBU_REC_TM is described in year, month, day, hour, minute, and second as the time to capture frames for an I picture, for example. VOBU_LCL_TM_ZONE records a time zone for VOBU_REC_TM. The time zone signifies an offset time from the UTC (Coordinated Universal Time) assigned by a user to the device. That is, the time zone is a time difference corresponding to the time (local time) in a country where the recording apparatus is used. As VOBU_REC_TM, it is possible to use the universal time (formal time used to record the time worldwide). In this case, VOBU_LCL_TM_ZONE is zeroed.

The camera information includes setup conditions for capturing such as F number (F_NUM), exposure time (EXP_TM), exposure program (EXP_PRG), exposure correction value (EXP_BIS_VAL), gain value (AGC), minimum lens F value (MAX_APE_VAL), flash (FLS), lens focal distance (FCL_LEN), white balance (WHT_BAL), scene capturing type (SCN_CAP_TYP), focus mode (FCS_MOD), subject distance (FCS_POS), camera-shake correction (IMG_STB), camera-shake correction limit (STB_LIM), digital zoom ratio (DIG_ZOM), and effect capturing (EFFECT).

For example, EXP_PRG records any one of none, manual, normal program, and preset as a class of an exposure program used for the camera during capturing. As its extended information, EXP_PRG further records any one of gain preference, shutter preference, and exposure preference, for example, when the camera uses the exposure program assigned with the preset class during capturing.

AGC records an AGC gain value in the signal processing system. FLS records strobe states during capturing such as flash enabled, flash disabled, red-eye reduction flash, and forced flash.

WHT_BAL records white balance adjustment modes specified for capturing. Specifiable white balance adjustment modes include, for example, "automatic", "hold", "manual", "candle", "incandescent light", "fluorescent light at low color temperature", "fluorescent light at high color temperature", "sunlight", "cloudiness", and "none".

SCN_CAP_TYP records subject types specified for capturing. Specifiable subject types include, for example, "standard", "landscape", "portrait", "night scene", and "none".

FCS_MOD records focus modes specified for capturing such as "automatic focus", "manual focus", and "none".

IMG_STB records "camera-shake correction enabled", "camera-shake correction disabled", or "none" to indicate whether or not the camera-shake correction function worked. STB_LIM records that a camera-shake correction limit exceeded to disable the camera-shake correction.

DIG_ZOM records a digital zoom ratio used for capturing. EFFECT records whether or not the effect capturing was performed, or records an effect type for the effect capturing.

The video recording apparatus records these pieces of additional recording information as follows.

Figure 9:
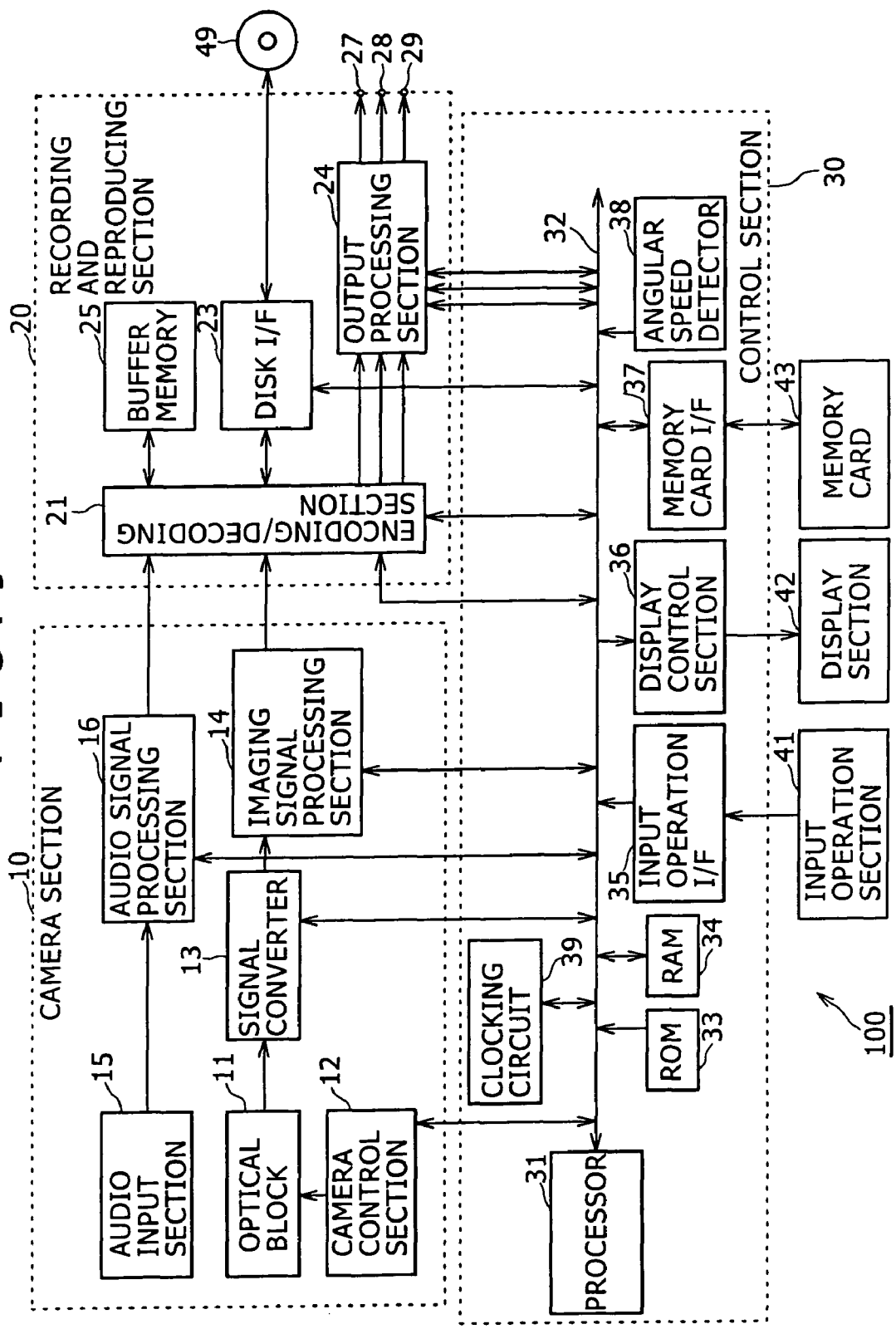
FIG. 9 shows the configuration of a portable device 100 as the video recording apparatus according to the embodiment of the present invention.

FIG. 9 shows the configuration of a portable device 100 as the video recording apparatus according to the embodiment of the present invention. The portable device 100 comprises a camera section 10, a recording and reproducing section 20, and a control section 30.

The camera section 10 comprises an optical block 11, a camera control section 12, a signal converter 13, an imaging signal processing section 14, an audio input section 15, and an audio signal processing section 16. The optical block 11 contains a group of lenses to image subjects, an aperture adjustment mechanism, a focus adjustment mechanism, a zoom mechanism, a shutter mechanism, a flash mechanism, and a camera-shake correction mechanism. The camera control section 12 receives a control signal from the control section 30 and generates a control signal to be supplied to the optical block 11. The camera control section 12 supplies the generated control signal to the optical block 11 to provide control such as zoom control, shutter control, and exposure control.

The signal converter 13 comprises an imaging element such as CCD (Charge Coupled Device) and uses its image formation surface to form an image passing through the optical block 11. The signal converter 13 receives a picture incorporation timing signal supplied from the control section 30 in response to a shutter operation. The signal converter 13 converts the subject image formed on the image formation surface into an imaging signal and supplies it to the imaging signal processing section 14.

Based on the control signal from the control section 30, the imaging signal processing section 14 provides the imaging signal with such processes as gamma correction and AGC (Auto Gain Control). In addition, the imaging signal processing section 14 converts the imaging signal into a picture signal as a digital signal. The audio input section 15 collects audio near the subject during capturing. An audio signal from the audio input section 15 is supplied to the audio signal processing section 16. Based on the control signal from the control section 30, the audio signal processing section 16 not only provides the audio signal with such processes as correction and AGC, but also converts the audio signal into a digital signal.

The recording and reproducing section 20 comprises a decoding/encoding circuit 21, a disk interface 23, an output processing section 24, and buffer memory 25.

The decoding/encoding circuit 21 has an encoding function that encodes and multiplexes a picture signal, an audio signal, and additional recording information from the camera section 10 and converts them into compressed data. On the other hand, the decoding/encoding circuit 21 has a decoding function that separates the picture signal, the audio signal, and the additional recording information from the compressed data and decodes them. Based on the control signal from the control section 30, the decoding/encoding circuit 21 further provides a picture signal from the imaging signal processing section 14 with automatic white balance control, exposure correction control, and enlargement control in accordance with the digital zoom ratio.

The disk interface 23 receives compressed data from the decoding/encoding circuit 21 and writes it to a disk 49. The disk interface 23 reads the compressed data from the disk 49 and supplies it to the decoding/encoding circuit 21. Under control of the control section 30, the output processing section 24 supplies compressed data from the decoding/encoding circuit 21 to the control section 30 and output terminals 27 through 29. The buffer memory 25 comprises SDRAM, for example, and is used as a work area for encoding or decoding in the decoding/encoding circuit 21.

The control section 30 comprises the following connected to each other via a system bus 32: a processor 31; ROM (Read Only Memory) 33; RAM (Random Access Memory) 34; an input operation interface 35 to connect with an input operation section 41; a display control section 36 to connect with a display section 42; a memory card interface 37 to mount a memory card 43; an angular velocity detector 38 to detect an angular velocity for camera-shake correction; and a clock circuit 39 to record the capturing time.

The processor 31 is responsible for the entire process of the control section 30 and uses the RAM 34 as a work area. The ROM 33 stores a program to control the camera section 10 and another program to execute control over recording and reproducing picture signals and audio signals.

The input operation section 41 connected to the input operation interface 35 is provided with a plurality of keys such as a mode changeover key to switch between modes such as a capture mode and a reproduction mode, a zoom adjustment key, an exposure adjustment key, a shutter key, a motion picture capturing key, and a display adjustment key on the display section 42. The input operation interface 35 transmits operation signals from the input operation section 41 to the processor 31. The processor 31 determines which key has been operated on the input operation section 41, and then performs a control process according to the determination result.

The display section 42 is connected to the display control section 36 and comprises an LCD (Liquid Crystal Display), for example. Under control of the processor 31, the display section 42 displays picture signals from the camera section 10 and those read from the disk 49.

The memory card interface 37 writes compressed data from the decoding/encoding circuit 21 to the memory card 43. Further, the memory card interface 37 reads compressed data from the memory card 43 and supplies it to the decoding/encoding circuit 21. The clock circuit 39 generates time information representing year, month, day, hour, minute, and second.

The angular velocity detector 38 is a gyroscope that detects an angular velocity applied to the portable device 100 from the outside. The angular velocity information [$\omega=(\theta/\text{second})$] is provided from the angular velocity detector 38 and is reported to the processor at a specified interval. When an integration value [$\theta$] from the beginning of the recording exceeds a specified value (e.g., 5°), it is assumed to exceed the camera-shake correction limit. A flag is set for STB_LIM in the additional recording information. The angular velocity information $\omega$ can be +$\omega$ to indicate shift to the right from the screen center and can be −$\omega$ to indicate shift to the left therefrom.

The following describes a disk finalization process according to the embodiment of the present invention.

After recording on a DVD-R or DVD-RW disk, the finalization process is needed to reproduce the recorded content on a DVD-Video reproduction apparatus as mentioned above. Contents of the finalization process vary with recording systems for media.

The INC (Incremental recording) system is used for recording with the video format for DVD-R media. The INC system complies with sequential writing and, in principle, is incapable of overwriting on a medium once written. In addition to the INC system, the ROW (Restricted OverWrite mode) system is used for recording with the video format for DVD-RW media. The ROW system is capable of overwriting and is only capable of sequential writing on unrecorded areas like the INC system. Recording area information for the INC and ROW systems is managed in a Recording Management Area (RMA) that is located more inward than the lead-in area 711 (FIG. 1).

Figure 10:
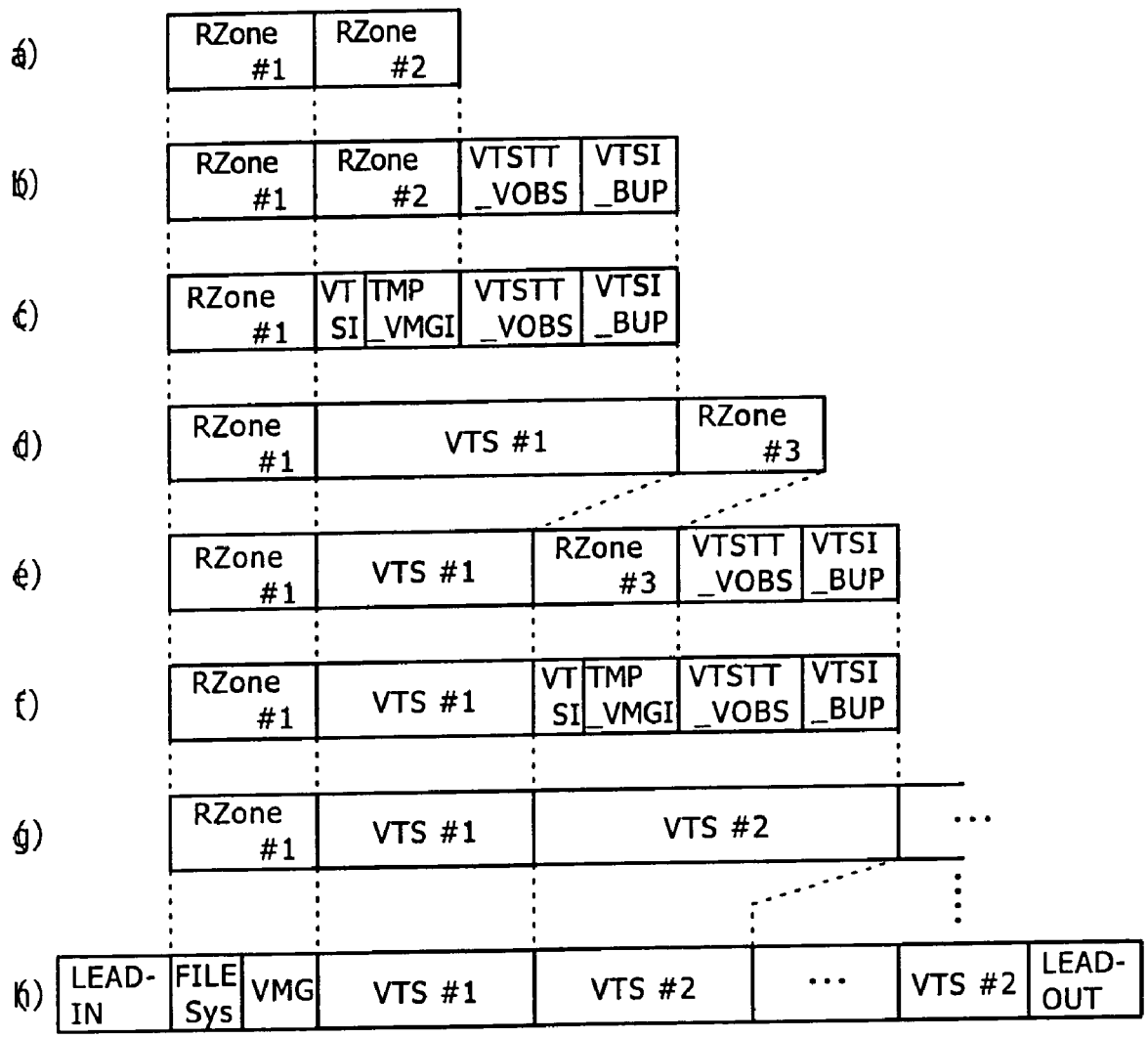
FIG. 10 shows a recording procedure according to an INC (Incremental recording) system.

FIG. 10 shows a recording procedure according to the INC system. This INC system defines up to three areas that can be written at a time. Each of these areas is referred to as Rzone. The above-mentioned RMA also manages the Rzone.

FIG. 10(a) shows reservation of a file system area (RZone#1) and a VTSI area (RZone#2). RZone#2 is followed by an invisible RZone (not shown), i.e., an area where data can be effectively added.

FIG. 10(b) shows that actual data VTSTT_VOBS is recorded. The VTSI information is generated and is recorded as VTSI_BUP next to VTSTT_VOBS.

In FIG. 10(c), RZone#2 records VTSI and TeMPorary Video ManaGer Information (TMP_VMGI) to temporarily manage recorded actual data information. At this time, the first video title set (VTS#1) is complete.

In FIG. 10(d), VTS#1 is followed by RZone#3, an area for the next video title set.

In FIG. 10(e), the next actual data VTSTT_VOBS is recorded. The VTSI information is generated and is recorded as VTSI_BUP next to VTSTT_VOBS.

In FIG. 10(f), RZone#3 records VTSI and TMP_VMGI. At this time, the second video title set (VTS#2) is complete. At this time, TMP_VMGI records information about VTS#1 and VTS#2. TMP_VMGI is recorded at a plurality of positions in the middle of writing. The most recent TMP_VMGI is recorded at the outermost periphery. The subsequent processes follow the most recent TMP_VMGI.

In FIG. 10(g), the subsequent video title sets are recorded according to the similar procedure.

In FIG. 10(h), the finalization process is performed to create a file system and VMG from the management information about each title in the most recent TMP_VMGI. The created file system and VMG are recorded in RZone#1. Further, the lead-in area and the lead-out area are recorded.

Figure 11:
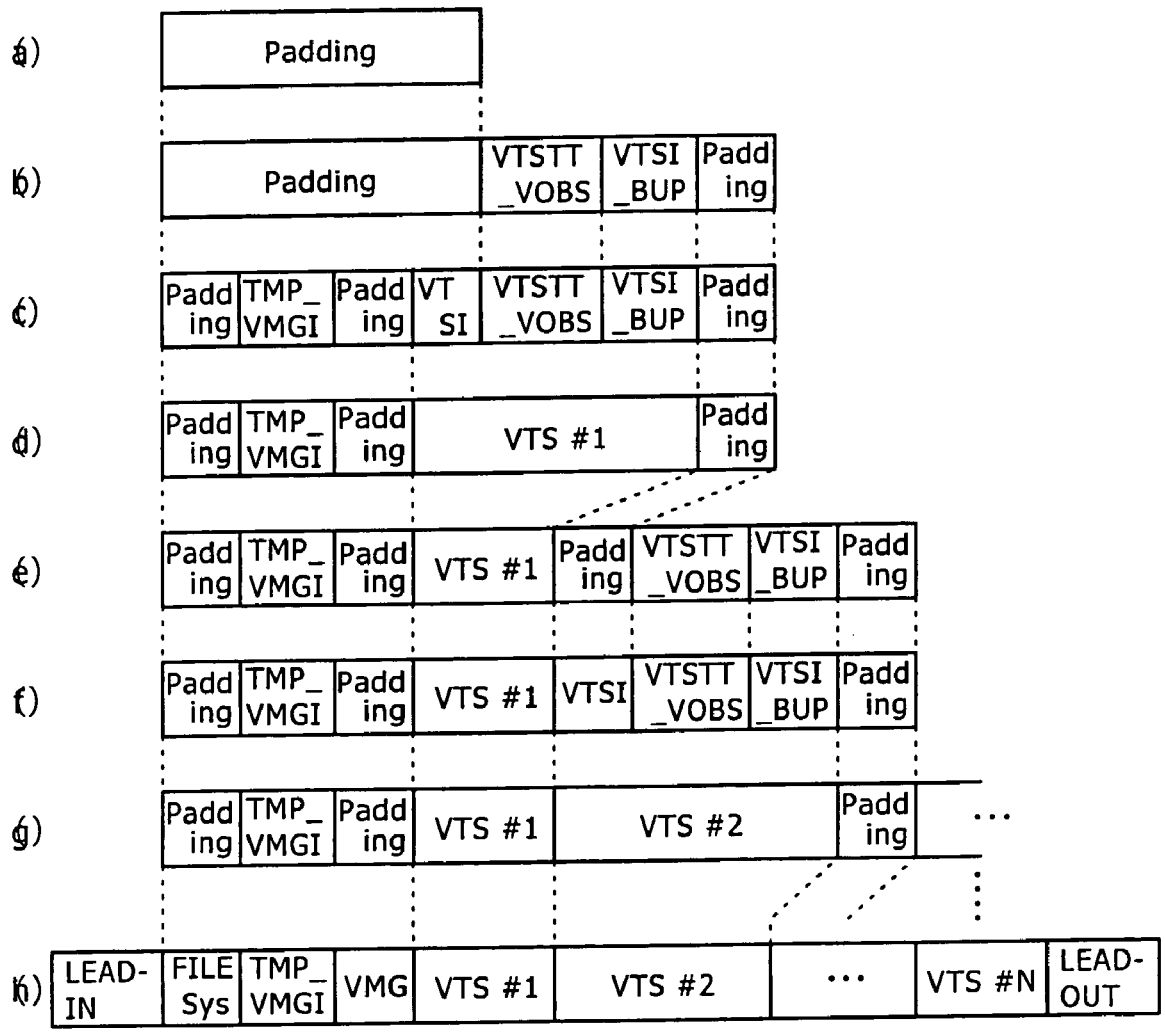
FIG. 11 shows a recording procedure according to a ROW (Restricted OverWrite mode) system.

FIG. 11 shows a recording procedure according to the ROW system. The ROW system treats the entire data area as one RZone.

As shown in FIG. 11(a), fixed data or the like is used to write padding to reserve areas for the file system, VMG, and VTSI. This moves a position of NWA (Next Writable Address) toward the outside periphery.

In FIG. 11(b), actual data VTSTT_VOBS is recorded. The VTSI information is generated and is recorded as VTSI_BUP next to VTSTT_VOBS. Padding is then added to reserve an area for the next VTSI. The NWA position moves toward the outside periphery.

In FIG. 11(c), VTSI is recorded before VTSTT_VOBS. Further, TMP_VMGI is recorded between the file system area and the VMG area. At this time, the first video title set (VTS#1) is complete (FIG. 11(d)).

In FIG. 11(e), the next actual data VTSTT_VOBS is recorded. The VTSI information is generated and is recorded as VTSI_BUP next to VTSTT_VOBS. Padding is then added to reserve an area for the next VTSI. The NWA position moves toward the outside periphery.

In FIG. 11(f), VTSI is recorded before VTSTT_VOBS. Further, TMP_VMGI is overwritten between the file system area and the VMG area. At this time, the second video title set (VTS#2) is complete.

In FIG. 11(g), the subsequent video title sets are recorded according to the similar procedure.

In FIG. 11(h), the finalization process is performed to create a file system and VMG from the management information about each title in TMP_VMGI. The created file system and VMG are recorded in the area reserved by the padding (FIG. 11(a)). Further, the lead-in area and the lead-out area are recorded.

Figure 12:
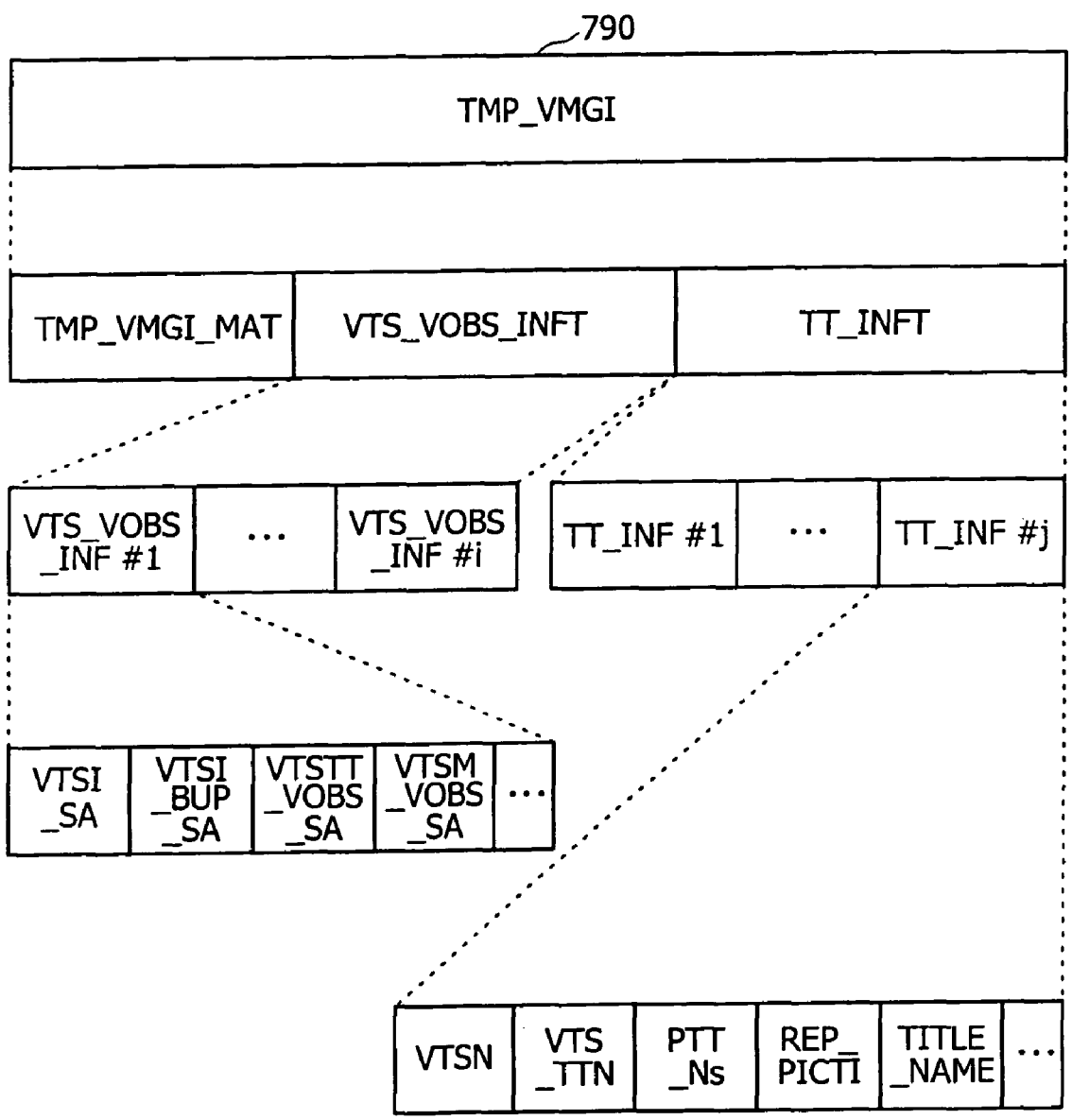
FIG. 12 shows the data structure of TMP_VMGI for temporarily managing recorded actual data information in FIGS. 10 and 11.

FIG. 12 shows the data structure of TMP_VMGI for temporarily managing recorded actual data information in FIGS. 10 and 11. TMP_VMGI 790 can have the data structure of a TMP_VMGI MAnagement Table (TMP_VMGI_MAT), a video title set (VTS) VOBS Information Table (VTS_VOBS_INFT), and a TiTle Information Table (TT_INFT).

The VTS_VOBS_INFT contains information about video title sets on the disk by categorizing each video title set as VTS_VOBS_INF. Each VTS_VOBS_INF contains start addresses (VTSI_SA, VTSI_BUP_SA, VTSTT_VOBS_SA, VTSM_VOBS_SA), sizes of data structures in the video title set and a video title set attribute. Consequently, reading the contents of the VTS_VOBS_INFT can obtain the video title set information about actual data recorded on the disk.

The TT_INFT contains information about each title existing on the disk by categorizing each title as TT_INF. Each TT_INF contains a VTS number (VTSN) corresponding to the title, a title number (VTS_TTN) in the VTS, the number of chapters (PTT_Ns), a location of a representative picture for the title (REP_PICTI), and a title name (TITLE_NAME). Consequently, reading the contents of the TT_INFT can obtain the title information about actual data recorded on the disk.

The following describes top menu examples created according to the embodiment of the present invention.

Figure 13:
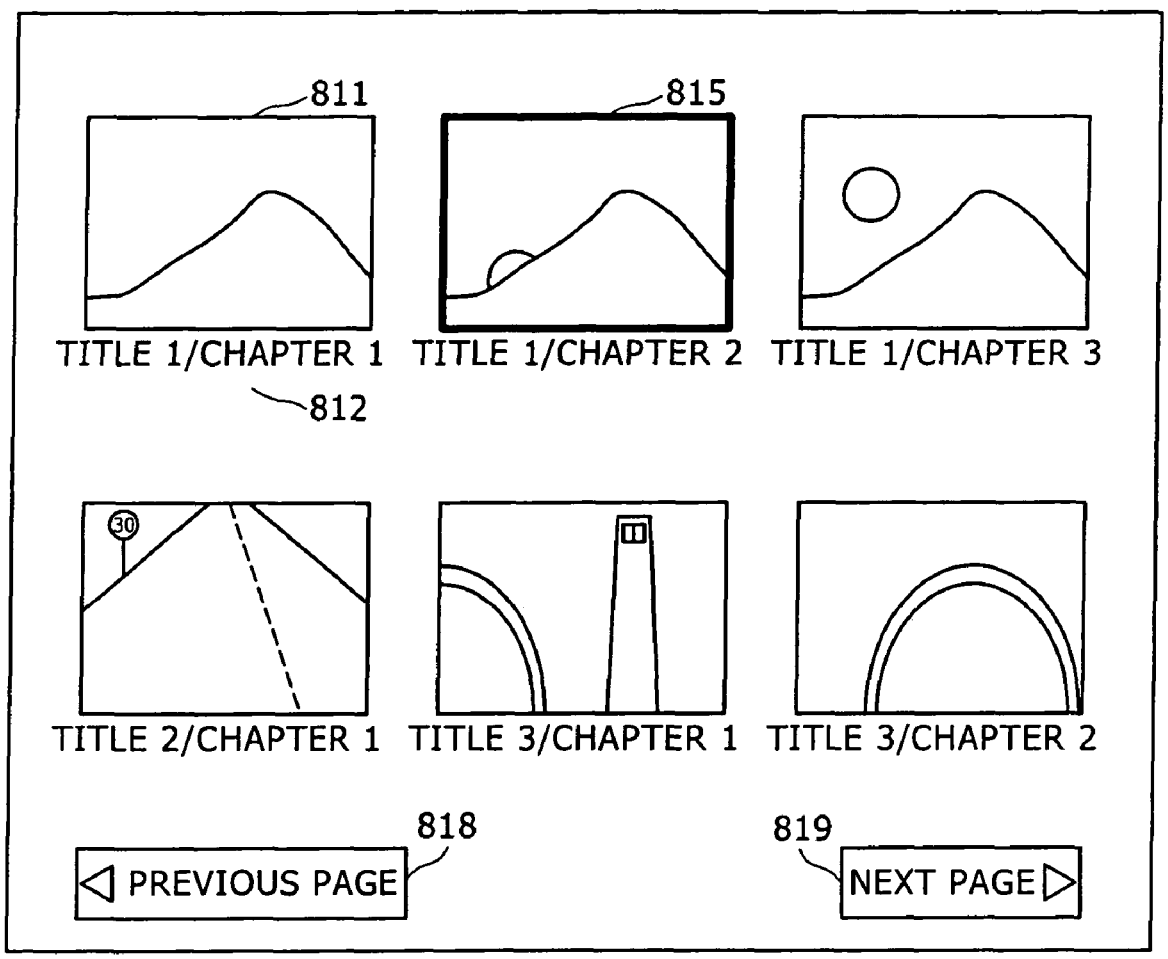
FIG. 13 shows a top menu example created according to the embodiment of the present invention.

FIG. 13 shows a top menu example created according to the embodiment of the present invention. The top menu uses a thumbnail 811 to display a representative picture for each chapter recorded on the disk. There is displayed a title number and chapter number 812 at the bottom of the thumbnail 811. Unlike ordinary chapter menus, the top menu arranges chapters belonging to different titles at the same level.

According to the example in FIG. 13, one menu displays six chapters. To display more chapters, the menu page needs to be changed. A previous page button 818 or a next page button 819 is used to change the menu page.

The VMGM_VOBS 732 records picture data corresponding to each page in the top menu. The picture itself of the thumbnail 811 is embedded as part of the menu page. A user can use an operation key such as a remote controller to operate a selection frame 815 that selects a thumbnail on the screen. The selection frame 815 is defined as a sub-picture. HighLight Information (HLI) of the PCI 772 (FIG. 3) in the NV_PCK 764 provides control of the highlight display.

The user uses a menu key as an operation key to call the menu screen and uses a 4-direction key to move the highlight display. There is a submit key at the center of the 4-direction key. Using the submit key can start reproducing a selected chapter or change pages.

This top menu example displays the title number and chapter number 812 at the bottom of the thumbnail 811. The title number and chapter number 812 may be displayed at the top of the thumbnail 811. Instead of or in addition to the title number and chapter number 812, each chapter's capturing time may be obtained from VOBU_REC_TIME in the ARI_PCK 768 for display. Another method may be used to display the chapter's capturing time in the foreground only when the selection frame 815 is highlighted.

Figure 14:
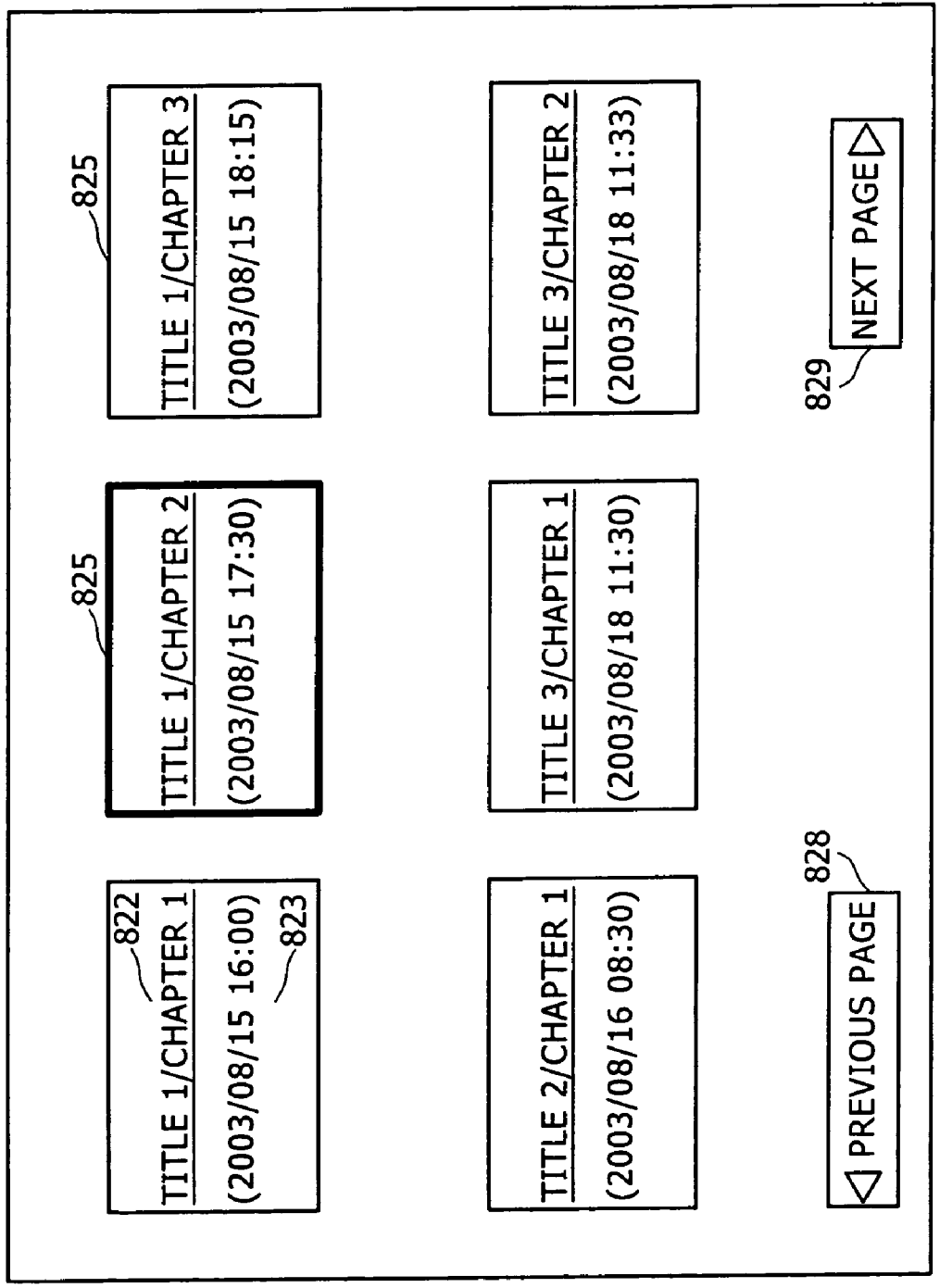
FIG. 14 shows another top menu example created according to the embodiment of the present invention.

FIG. 14 shows another top menu example created according to the embodiment of the present invention. This top menu displays a title number and chapter number 822 of each chapter recorded on the disk, not the thumbnail 811 in FIG. 13. A capturing time 823 of the chapter is displayed at the bottom of the title number and chapter number 822. A selection frame 825 is displayed around the title number and chapter number 822 and the capturing time 823. A previous page button 828 or a next page button 829 functions similarly to the example in FIG. 13.

The example in FIG. 14 displays no thumbnail in the top menu to eliminate the need for selecting a representative picture for each chapter during the finalization process. This makes it possible to fast create a disk compliant with the DVD-Video standard.

This top menu example in FIG. 14 displays the capturing time 823 at the bottom of the title number and chapter number 822. The capturing time 823 may be displayed at the top of the title number and chapter number 822. Another method may be used to display the chapter's capturing time in the foreground only when the selection frame 825 is highlighted.

Referring now to the accompanying drawings, the following describes a function configuration and its operations to implement the finalization process according to the embodiment of the present invention.

FIG. 15 shows a function configuration example to implement the finalization process according to the embodiment of the present invention. The function configuration includes a title retrieval section 310, a chapter retrieval section 320, a representative picture selection section 340, and a menu generation section 350.

From an optical disk as a recording medium, the title retrieval section 310 reads title information about each title of motion picture data recorded on the optical disk. For example, the TMP_VMGI 790 (FIG. 12) can be referenced as the title information. The TT_INFT in the TMP_VMGI 790 records, on a title basis, the VTS number (VTSN) storing the title and the title number in the VTS. The VTS_VOBS_INFT in the TMP_VMGI 790 records the storage position of the VTS in the disk corresponding to the VTS number. Accordingly, reference to these pieces of information makes it possible to obtain title storage positions.

The chapter retrieval section 320 reads chapter information about each chapter in the corresponding title based on the title information obtained in this manner. For example, the VTSI 741 (FIG. 6) can be referenced as the chapter information. The VTSI_PTT_SRPT in the VTSI 741 records, on a chapter basis, the PGC number associated with the chapter and its starting PG number. The PGC_PGMAP of VTSI_PGCIT in the VTSI 741 records a cell number corresponding to the PG number. The C_POSIT of VTSI_PGCIT in the VTSI 741 records a VOB_ID corresponding to the cell number and a cell ID number. Accordingly, reference to these pieces of information makes it possible to obtain a storage position of the starting cell in the chapter.

Based on the chapter information obtained in this manner, the representative picture selection section 340 selects a representative picture in each chapter. The representative picture can be selected from the VTSTT_VOBS 743, for example. Since the chapter retrieval section 320 determines the storage position of the starting cell in each chapter, a picture can be selected from the starting cell's first VOBU. As mentioned with reference to FIG. 4, the I picture in each VOBU is encoded independently of the other P pictures and B pictures and is suited for the use of retrieval as a separate picture. In principle, it is desirable to select the I picture in the starting cell's first VOBU as the representative picture.

Depending on picture situations, however, it may not be appropriate to select the representative picture from the starting cell's first VOBU. If a slight camera shake occurs, for example, the camera-shake correction function can correct it. The picture is hardly disordered. If a camera shake exceeds the camera-shake correction limit, the picture is disordered and is considered to be inappropriate for the representative picture. In another case, a specific type of effect capturing may generate the same picture at the beginning of all chapters. For example, let us consider a case where each chapter begins with the picture representing a curtain or a door. It is assumed to use effect capturing so that the curtain or the door opens to reveal an actual content. In this case, the same starting picture is used for all the chapters and cannot function as the representative picture. When such effect capturing is performed, it is desirable to select a representative picture from the VOBU that is located after a specified lapse of time from the beginning of the chapter.

REP_PICTI of the TT_INFT in the TMP_VMGI 790 (FIG. 12) specifies the storage location of each title's representative picture. Accordingly, the first chapter in each title may use the title's representative picture.

The menu generation section 350 generates the top menu including a display area to reproduce chapters based on the chapter information obtained by the chapter retrieval section 320. The top menu may contain representative pictures selected by the representative picture selection section 340 as shown in FIG. 13 or only text as shown in FIG. 14. The menu generation section 350 generates the top menu in this manner and records it as picture data in the VMGM_VOBS 732.

The finalization process is complete by recording the other VMG information, the lead-in area, the lead-out area, and the like. The DVD-Video reproduction apparatus can reproduce the finalized recording medium.

Figure 16:
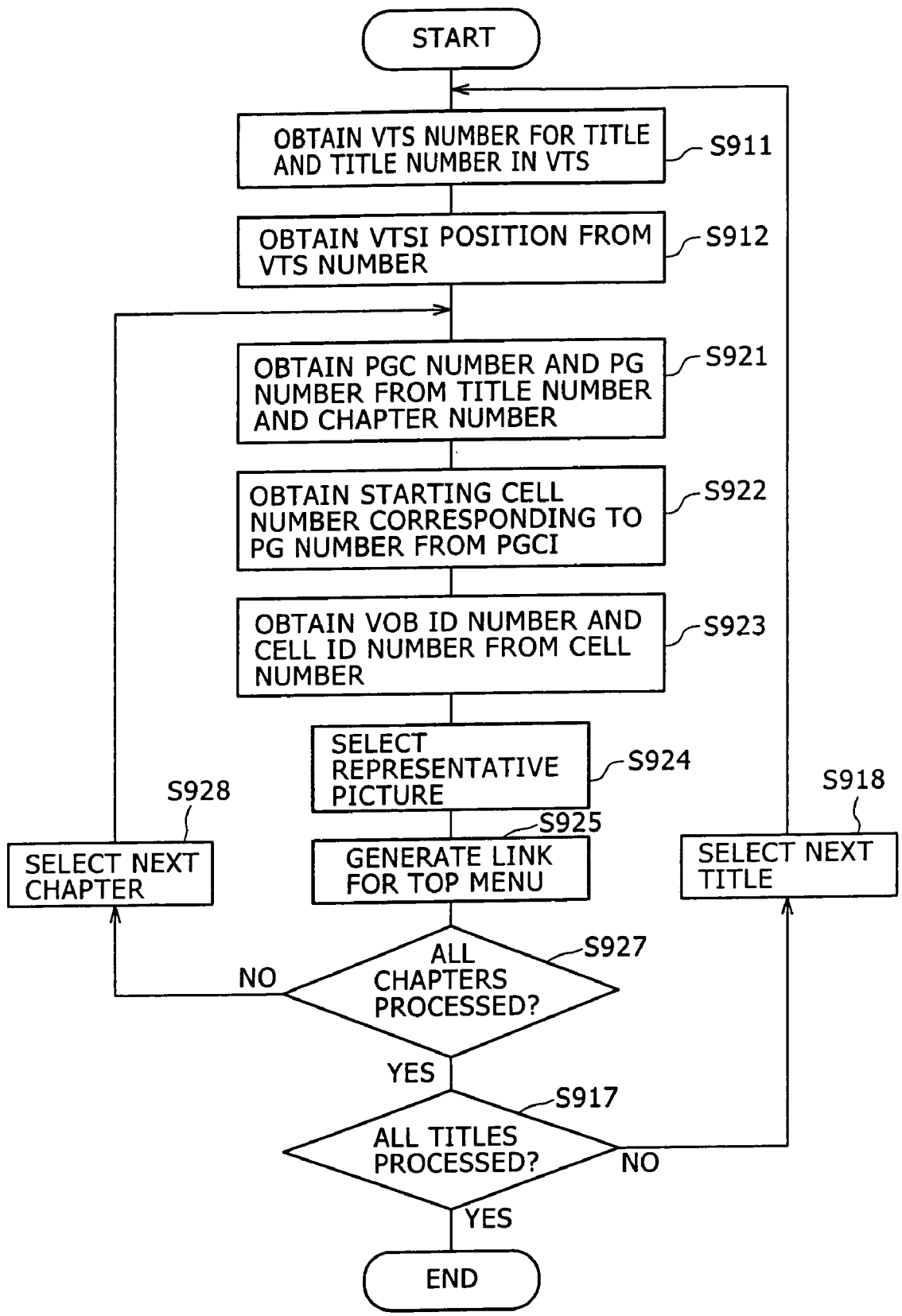
FIG. 16 shows a finalization process example according to the embodiment of the present invention.

FIG. 16 shows a finalization process example according to the embodiment of the present invention. The process reads the title information about titles of motion picture data recorded on an optical disk as a recording medium (steps S911 and S912). For example, the process obtains the first title's VTS number and a title number in the VTS from the TT_INFT in the TMP_VMGI 790 (step S911). The process references the VTS_VOBS_INFT in the TMP_VMGI 790 based on the obtained VTS number to obtain the VTSI position on the disk (step S912).

Based on the obtained title information, the process reads the chapter information about each chapter in each title (steps S921 through S923). That is, the process references the VTSI_PTT_SRPT in the VTSI 741 from the title number and the first chapter number in the VTS to obtain a PGC number and a starting PG number of the PGC associated with the chapter (step S921). The process then obtains a starting cell number corresponding to the starting PG number in the PGC_PGMAP of the VTSI_PGCIT in the VTSI 741 indicated by the PGC number (step S922). The process obtains a VOB_ID number and a cell ID number of the cell indicated by the starting cell number from the C_POSIT of the VTSI_PGCIT in the VTSI 741 (step S923).

The process selects a chapter's representative picture based on the VOB_ID number and the cell ID number obtained at step S923 (step S924). Selection of the chapter representative picture will be described later with reference to FIG. 17.

The process generates the top menu including a display area to reproduce the chapters based on the chapter information obtained up to step S923 (step S925). At this time, the top menu may display the chapters representative picture selected at step S924.

When the process so far is not complete with respect to all chapters in the title, the process selects the next chapter in the title (step S928) and is repeated from step S911 (step S927). When the process so far is complete with respect to all chapters in the title (step S927), it is determined whether or not the process so far is complete with respect to all titles (step S917). When the process so far is not complete with respect to all titles, the process selects the next title (step S918) and is repeated from step S911. When the process so far is complete with respect to all the titles, the top menu creation process terminates.

Figure 17:
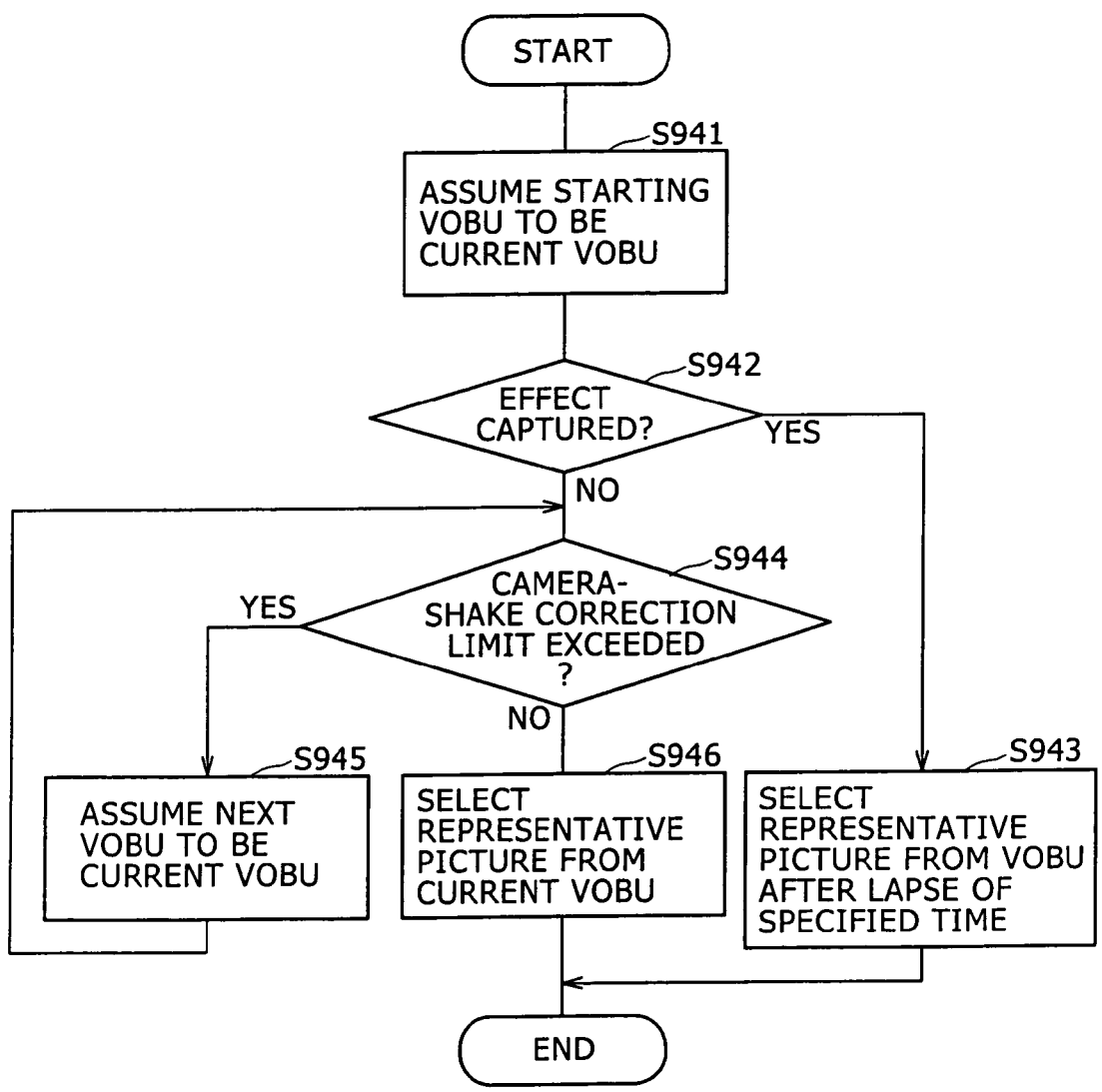
FIG. 17 exemplifies a process to select a chapter representing image (step S924) according to the embodiment of the present invention.

FIG. 17 exemplifies a process to select a chapter representing image (step S924) according to the embodiment of the present invention. The process first assumes the starting cell's beginning VOBU to be the current VOBU (step S941). It may become apparent that specified effect capturing is performed according to the effect capturing (EFFECT) in the ARI_PCK 768 (FIG. 8) for the starting cell's beginning VOBU (step S942). In this case, pictures in the VOBU are excluded from the selection target. The process selects a chapter representing picture (e.g., the I picture) from the VOBU that is located after a specified lapse of time from the beginning VOBU (step S943). The VTSI_TMAPT in the VTSI 741 (FIG. 6) can be referenced to specify the VOBU based on the elapsed time.

When no effect capturing is performed, the process may determine an excess over the camera-shake correction limit (STB_LIM) in the ARI_PCK 768 (FIG. 8) for the current VOBU (step S944). In this case, pictures in the VOBU are excluded from the selection target. The process assumes the next VOBU to be the current VOBU and rechecks the camera-shake correction limit (step S945). When the STB_LIM indicates no excess over the limit at step S944, the process selects a picture in the current VOBU at that time as the chapter representing picture (step S946).

According to the embodiment of the present invention, the finalization process can use the menu generation section 350 to generate the top menu including the display area for reproducing chapters based on the chapter information obtained by the chapter retrieval section 320.

A modification of the embodiment of the present invention will now be described. According to the above-mentioned embodiment, the top menu displays all chapters of all titles.

Displaying all chapters causes no problem when the camcorder records all titles on the disk. When a title is recorded on a desktop deck (recorder) other than the camcorder, however, it is designed to divide the title into chapters at a specified time interval. The title is automatically divided into chapters independently of recording contents. If the top menu displays all chapters of the title recorded by the recorder, the menu display becomes different from a user's intention. In addition, unexpectedly many chapters are displayed. As will be described later, the modification of the embodiment according to the present invention determines types of apparatuses used for recording titles and changes modes of displaying chapters on the top menu.

Figure 18:
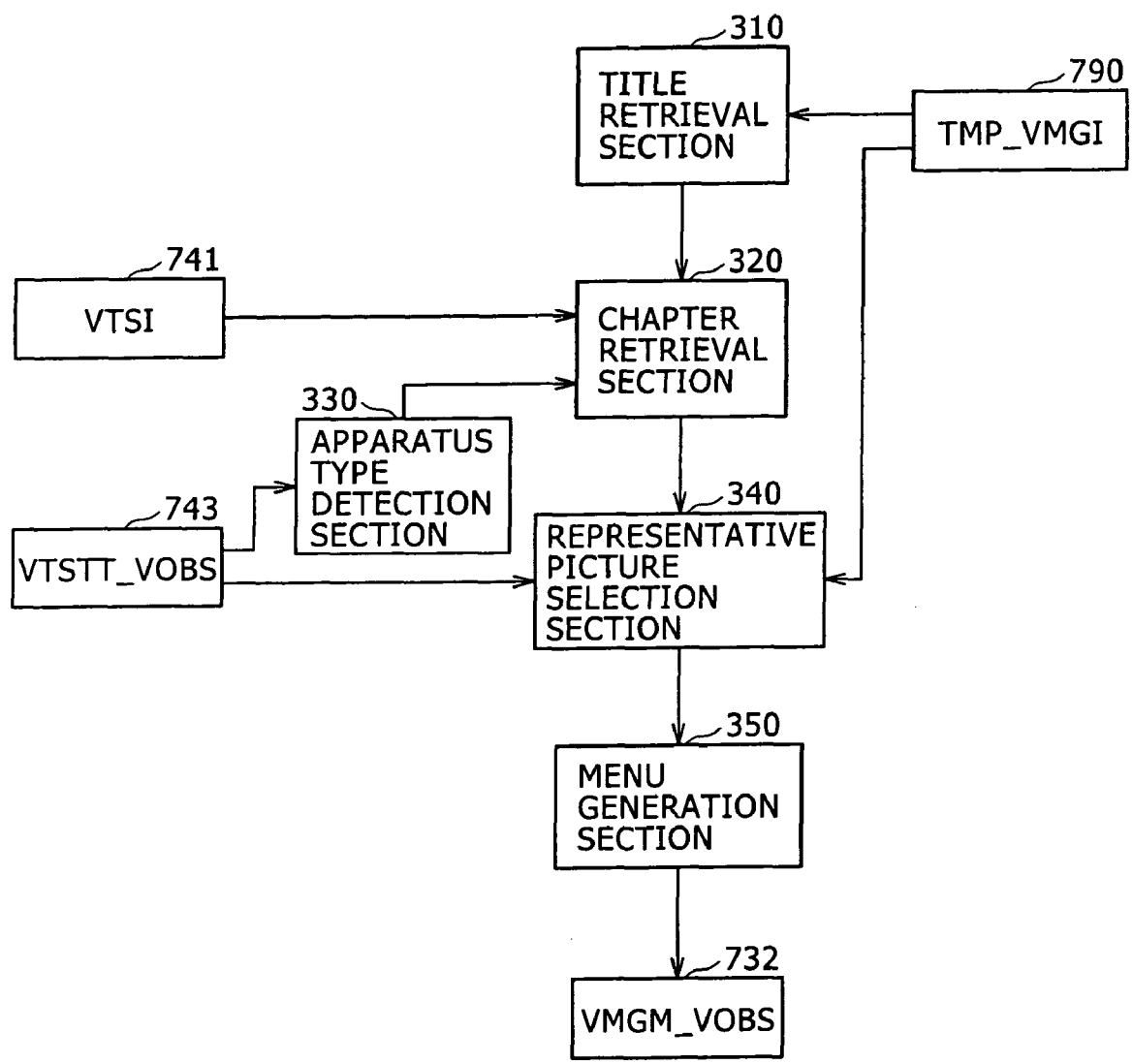
FIG. 18 shows another function configuration example to implement a finalization process according to the embodiment of the present invention.

FIG. 18 shows another function configuration example to implement a finalization process according to the embodiment of the present invention. This function configuration includes an apparatus type detection section 330 in addition to the example in FIG. 15. The apparatus type detection section 330 detects a type of apparatus that records titles on the disk. The ARI_PCK 768 (FIG. 8) can be used to detect the apparatus type. That is, reference to the apparatus type (PRD_TYP) for the ARI_PCK 768 in each title's VTST-T_VOBS 743 makes it possible to determine whether the title is recorded by a camcorder or a recorder.

According to a detection result from the apparatus type detection section 330, a chapter retrieval section 320 determines whether to read the chapter information about all chapters contained in each title or about only the beginning chapter. This limits chapters that are generated by a menu generation section 350 and are displayed on the top menu.

Figure 19:
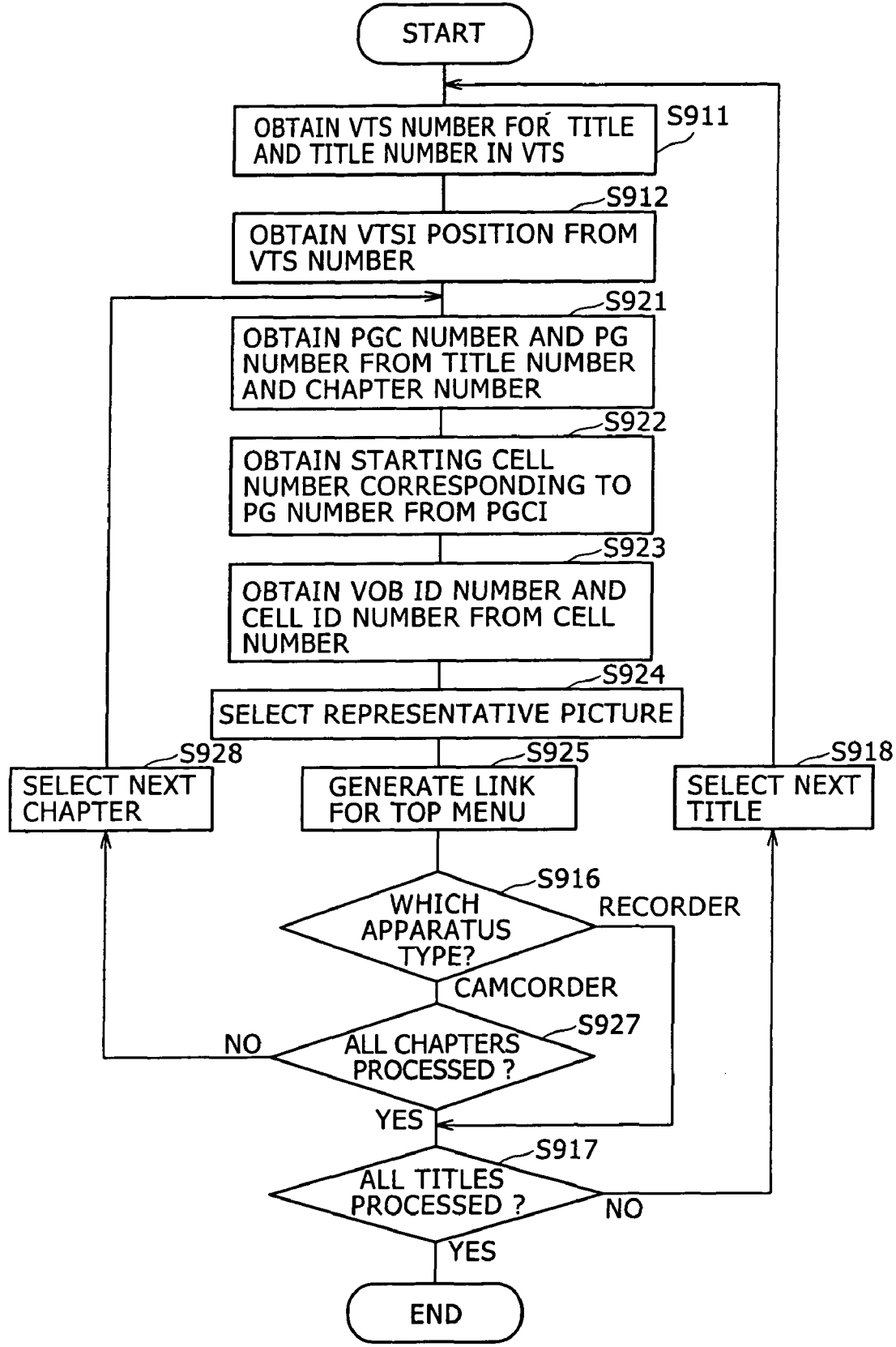
FIG. 19 shows another finalization process example according to the embodiment of the present invention.

FIG. 19 shows another finalization process example according to the embodiment of the present invention. In addition to the example in FIG. 16, this process adds a step (step S916) to determine the apparatus type. When the process terminates with respect to the beginning chapter in each title, the process determines the apparatus type from PRD_TYP in the ARI_PCK 768. When a camcorder is the apparatus to record the title, the process selects the next chapter to display all chapters in the title (step S927). When a recorder is the apparatus to record the title, the process selects the next title to display only the beginning chapter in the title (step S917).

In this manner, the modification of the embodiment according to the present invention uses the apparatus type detection section 330 to determine the type of the apparatus that recorded the title. When the camcorder is used, the top menu can display all chapters in the title. When the recorder is used, the top menu can display only the beginning chapter in the title. These determination processes are performed on the title basis. When the same disk contains a mixture of titles recorded by different types of apparatuses, it is possible to provide the display corresponding to the apparatus type.

The embodiment of the present invention represents an example of embodying the invention. As will be described later, the embodiment corresponds to specified items of the present invention in the appended claims. Furthermore, the present invention is not limited thereto and may be embodied in various modifications without departing from the spirit and scope of the invention.

In claim 1, title retrieval means corresponds to the title retrieval section 310, for example. Chapter retrieval means corresponds to the chapter retrieval section 320, for example. Menu generation means corresponds to the menu generation section 350, for example.

In claim 3 representative picture selection means corresponds to the representative picture selection section 340, for example.

In claim 4, closed picture data corresponds to the I picture, for example.

In claim 6, a specified attribute corresponds to an excess over the camera-shake correction or specified effect capturing, for example.

In claim 9, apparatus type detection means corresponds to the apparatus type detection section 330.

In claim 11 or 14, a procedure to read title information about each title for motion picture data recorded on the recording medium from the recording medium corresponds to steps S911 and S912, for example. A procedure to read chapter information about each chapter in each title based on the title information corresponds to steps S921 through S923, for example. A procedure to generate a top menu including a display area for reproducing each chapter and to record the top menu on a recording medium corresponds to step S925, for example.

In claim 12 or 15, a procedure to read title information about each title for motion picture data recorded on the recording medium from the recording medium corresponds to steps S911 and S912, for example. A procedure to read chapter information about each chapter in each chapter based on the title information corresponds to steps S921 through S923, for example. A procedure to select a representative picture in each chapter based on the chapter information corresponds to step S924, for example. A procedure to generate a top menu for providing a display area to reproduce each chapter in relation to a representative picture based on the chapter information and to record the top menu on a recording medium corresponds to step S925, for example.

In claim 13 or 16, a procedure to read title information about each title for motion picture data recorded on the recording medium from the recording medium corresponds to steps S911 and S912, for example. A procedure to read chapter information about the beginning chapter in each title based on the title information corresponds to steps S921 through S923, for example. A procedure to detect an apparatus type to record motion picture data on a recording medium for each title corresponds to step S916, for example. When a specified apparatus type is determined, a procedure to read chapter information about each chapter following the beginning chapter corresponds to step S916, for example. A procedure to generate a top menu including a display area for reproducing each chapter based on the chapter information and to record the top menu on a recording medium corresponds to step S925, for example.

The processes described in the embodiment of the present invention may be interpreted as a method having a series of these processes. The processes may be also interpreted as a program allowing a computer to execute a series of these processes or as a recording medium to store the program.

The present invention can provide an excellent effect of finalizing a recording medium and allowing a top menu to reflect information about each chapter contained in the recording medium.

An example of the present invention can be applied to a finalization process performed to enable a DVD-Video reproduction apparatus to reproduce contents recorded on a DVD-R or DVD-RW medium.

The invention claimed is:
1. An information recording apparatus, comprising:
title retrieval means for reading from a recordable medium title information for respective titles for motion picture data recorded on the recordable medium;
chapter retrieval means for reading chapter information for respective chapters in the respective titles based on the title information;

representative picture selection means for selecting a representative picture for each of the respective chapters based on the chapter information; and menu generation means for generating a top menu and for recording the top menu on the recordable medium, the top menu including a display area for reproducing the respective chapters based on the chapter information and including each said representative picture, said representative picture selection means being operable to determine whether specified effect capturing is to be performed, and when such determination indicates that the specified effect capturing is to be performed, the representative picture selection means selects the respective picture from picture data of a group of pictures located after a first group of pictures of the respective chapter.

2. An information recording apparatus, comprising:

title retrieval means for reading from a recordable medium title information for respective titles for motion picture data recorded on the recordable medium;

chapter retrieval means for reading chapter information for respective chapters in the respective titles based on the title information;

menu generation means for generating a top menu and for recording the top menu on the recordable medium, the top menu including a display area for reproducing the respective chapters based on the chapter information; and representative picture selection means for selecting a representative picture in the respective chapters based on the chapter information, wherein the menu generation means generates the top menu so as to contain the representative picture associated with a corresponding display area, wherein the representative picture selection means selects first closed picture data in the respective chapters as the representative picture, and wherein, when the first closed picture data has a specified attribute, the representative picture selection means selects succeeding closed picture data not having the specified attribute as the representative picture.

3. The information recording apparatus according to claim 2, wherein, when the first closed picture data exceeds a camera-shake correction limit, the representative picture selection means selects succeeding closed picture data not exceeding the camera-shake correction limit as the representative picture.

4. An information recording apparatus, comprising:

title retrieval means for reading from a recordable medium title information for respective titles for motion picture data recorded on the recordable medium;

chapter retrieval means for reading chapter information for respective chapters in the respective titles based on the title information;

menu generation means for generating a top menu and for recording the top menu on the recordable medium, the top menu including a display area for reproducing the respective chapters based on the chapter information; and representative picture selection means for selecting a representative picture in the respective chapters based on the chapter information, wherein the menu generation means generates the top menu so as to contain the representative picture associated with a corresponding display area, wherein the representative picture selection means selects first closed picture data in the respective chapters as the representative picture, and wherein, when the first closed picture data depends on specified effect capturing, the representative picture selection means selects succeeding closed picture data independent of the specified effect capturing as the representative picture.

5. The information recording apparatus according to claim 1, further comprising:

apparatus type detection means for detecting an apparatus type having recorded the motion picture data for the respective titles on the recordable medium, wherein the chapter retrieval means, when the apparatus type for a title corresponds to a specified type, reads the chapter information for all chapters contained in the title and, when the apparatus type for the title does not correspond to the specified type, reads the chapter information only for a beginning chapter in the title.

6. An information recording apparatus, comprising:

title retrieval means for reading from a recordable medium title information for respective titles for motion picture data recorded on the recordable medium;

chapter retrieval means for reading chapter information for respective chapters in the respective titles based on the title information; and menu generation means for generating a top menu and for recording the top menu on the recordable medium, the top menu including a display area for reproducing the respective chapters based on the chapter information; and apparatus type detection means for detecting an apparatus type having recorded the motion picture data for the respective titles on the recordable medium, wherein the chapter retrieval means, when the apparatus type for a title corresponds to a specified type, reads the chapter information for all chapters contained in the title and, when the apparatus type for the title does not correspond to the specified type, reads the chapter information only for a beginning chapter in the title, and wherein, when the apparatus type for a title is a camcorder, the chapter retrieval means reads the chapter information for all chapters contained in the title and, when the apparatus type for the title is not a camcorder, reads the chapter information only for a beginning chapter in the title.

7. An information recording method, comprising:

reading from a recordable medium title information for respective titles for motion picture data recorded on the recordable medium;

reading chapter information for respective chapters in the respective titles based on the title information;

selecting a representative picture for each of the respective chapters based on the chapter information; and generating a top menu and recording the top menu on the recordable medium, the top menu including a display area for reproducing the respective chapters associated with the representative pictures based on the chapter information and including each said representative picture, said selecting including determining whether specified effect capturing is to be performed, and when such determination indicates that the specified effect capturing is to be performed, selecting the respective picture from picture data of a group of pictures located after a first group of pictures of the respective chapter.

8. An information recording method, comprising:
reading from a recordable medium title information for respective titles for motion picture data recorded on the recordable medium;
reading chapter information for a beginning chapter in the respective titles based on the title information;
detecting an apparatus type having recorded the motion picture data for the respective titles on the recordable medium;
reading the chapter information for respective chapters following the beginning chapter when the apparatus type corresponds to a specified type; and
generating a top menu and recording the top menu on the recordable medium, the top menu including a display area for reproducing the respective chapters based on the chapter information,
wherein, when the apparatus type for a title is a camcorder, the chapter information for all chapters contained in the title are read and, when the apparatus type for the title is not a camcorder, the chapter information only for a beginning chapter in the title is read.

9. A non-transitory recording medium recorded with a program for causing a computer to execute an information recording method, the method comprising:
reading from a recordable medium title information for respective titles for motion picture data recorded on the recordable medium;
reading chapter information for respective chapters in the respective titles based on the title information;
selecting a representative picture for each of the respective chapters based on the chapter information; and
generating a top menu and recording the top menu on the recordable medium, the top menu including a display area for reproducing the respective chapters associated with the respective pictures based on the chapter information and including each said representative picture,
said selecting including determining whether specified effect capturing is to be performed, and when such determination indicates that the specified effect capturing is to be performed, selecting the respective picture from picture data of a group of pictures located after a first group of pictures of the respective chapter.

10. A non-transitory recording medium recorded with a program for causing a computer to execute an informative recording method, the information recording method comprising:
reading from a recordable medium title information for respective titles for motion picture data recorded on the recordable medium;
reading chapter information for a beginning chapter in the respective titles based on the title information;
detecting an apparatus type having recorded the motion picture data for the respective titles on the recordable medium;
reading the chapter information for respective chapters following the beginning chapter when the apparatus type corresponds to a specified type; and
generating a top menu and recording the top menu on the recordable medium, the top menu including a display area for reproducing the respective chapters based on the chapter information,
wherein, when the apparatus type for a title is a camcorder, the chapter information for all chapters contained in the title are read and, when the apparatus type for the title is not a camcorder, the chapter information only for a beginning chapter in the title is read.

11. An information recording apparatus, comprising:
a title retrieval section operable to read from a recordable medium title information for respective titles for motion picture data recorded on the recordable medium;
a chapter retrieval section operable to read chapter information for respective chapters in the respective titles based on the title information;
a representative picture selection section operable to select a representative picture for each of the respective chapters based on the chapter information; and
a menu generation section operable to generate a top menu and to record the top menu on the recordable medium, the top menu including a display area for reproducing the respective chapters based on the chapter information and including each said representative picture,
said representative picture selection section being operable to determine whether specified effect capturing is to be performed, and when such determination indicates that the specified effect capturing is to be performed, the representative picture selection section selects the respective picture from picture data of a group of pictures located after a first group of pictures of the respective chapter.

12. The information recording apparatus according to claim 11, further comprising:
an apparatus type detection section operable to detect an apparatus type having recorded the motion picture data for the respective titles on the recordable medium,
wherein the chapter retrieval section, when the apparatus type for a title corresponds to a specified type, reads the chapter information for all chapters contained in the title and, when the apparatus type for the title does not correspond to the specified type, reads the chapter information only for a beginning chapter in the title.

13. The information recording apparatus according to claim 1, wherein, when said determination indicates that the specified effect capturing is not to be performed, the representative picture selection means determines whether picture data of a current group of pictures has a specified attribute and, when the picture data of the current group of pictures has the specified attribute, the representative picture selection means selects the respective picture from picture data of a succeeding group of pictures which does not have the specified attribute.

14. The information recording apparatus according to claim 11, wherein, when said determination indicates that the specified effect capturing is not to be performed, the representative picture selection section determines whether picture data of a current group of pictures has a specified attribute and, when the picture data of the current group of pictures has the specified attribute, the representative picture selection section selects the respective picture from picture data of a succeeding group of pictures which does not have the specified attribute.

* * * * *